US011019533B2

(12) United States Patent
Chen

(10) Patent No.: US 11,019,533 B2
(45) Date of Patent: May 25, 2021

(54) SERVICE TRAFFIC CONTROL METHOD AND SYSTEM AND DECISION NETWORK ELEMENT

(71) Applicant: HUAWEI TECHNOLOGIES CO., LTD., Guangdong (CN)

(72) Inventor: Bin Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 15 days.

(21) Appl. No.: 16/244,482

(22) Filed: Jan. 10, 2019

(65) Prior Publication Data
US 2019/0150034 A1 May 16, 2019

Related U.S. Application Data

(63) Continuation of application No. PCT/CN2017/079457, filed on Apr. 5, 2017.

(30) Foreign Application Priority Data

Jul. 11, 2016 (CN) .......................... 201610546165.8

(51) Int. Cl.
H04W 28/12 (2009.01)
H04W 28/08 (2009.01)
(Continued)

(52) U.S. Cl.
CPC ......... *H04W 28/12* (2013.01); *H04L 41/5019* (2013.01); *H04L 43/0876* (2013.01);
(Continued)

(58) Field of Classification Search
CPC .. H04W 28/08; H04W 28/12; H04L 43/0876; H04L 47/826; H04L 47/822; H04L 47/70; H04L 41/5019
See application file for complete search history.

(56) References Cited

U.S. PATENT DOCUMENTS

2008/0247320 A1* 10/2008 Grah ................... H04L 41/5012
370/241
2008/0259794 A1* 10/2008 Zou ..................... H04L 41/5025
370/231
(Continued)

FOREIGN PATENT DOCUMENTS

CN 1852233 A 10/2006
CN 101136864 A 3/2008
(Continued)

OTHER PUBLICATIONS

Extended European Search Report issued in European Application No. 17826800.9 dated Apr. 17, 2019, 9 pages.
(Continued)

*Primary Examiner* — Yemane Mesfin
*Assistant Examiner* — Henry Baron
(74) *Attorney, Agent, or Firm* — Fish & Richardson P.C.

(57) ABSTRACT

In the communications system, according to reference load information and reference traffic information, a decision network element determines target traffic control information and sends the target traffic control information to an execution network element, where the target traffic control information indicates a processing policy of a request of a target service; and the execution network element executes, for the target service, the processing policy of the service request of the target service according to the target traffic control information.

29 Claims, 6 Drawing Sheets

(51) Int. Cl.
  *H04L 12/26* (2006.01)
  *H04L 12/911* (2013.01)
  *H04L 12/24* (2006.01)

(52) U.S. Cl.
  CPC ............ *H04L 47/70* (2013.01); *H04L 47/822* (2013.01); *H04L 47/826* (2013.01); *H04W 28/08* (2013.01)

(56) References Cited

U.S. PATENT DOCUMENTS

| | | | |
|---|---|---|---|
| 2010/0046532 A1* | 2/2010 | Okita | H04L 43/0817 370/401 |
| 2010/0333171 A1 | 12/2010 | You et al. | |
| 2012/0198512 A1* | 8/2012 | Zhou | H04L 47/122 726/1 |
| 2014/0379922 A1 | 12/2014 | Xiao et al. | |

FOREIGN PATENT DOCUMENTS

| | | | |
|---|---|---|---|
| CN | 101237447 | A | 8/2008 |
| CN | 101237448 | A | 8/2008 |
| CN | 101431449 | A | 5/2009 |
| CN | 101977367 | A | 2/2011 |
| CN | 103618677 | A | 3/2014 |
| EP | 2242233 | A1 | 10/2010 |
| EP | 2663037 | A1 | 11/2013 |

OTHER PUBLICATIONS

International Search Report and Written Opinion issued in International Application No. PCT/CN2017/079457 dated Jul. 6, 2017, 16 pages.

Office Action issued in Chinese Application No. 201610546165.8 dated Jun. 2, 2020, 24 pages (with English translation).

Office Action issued in Chinese Application No. 201610546165.8 dated Nov. 5, 2020, 6 pages (with English translation).

* cited by examiner

SERVICE TRAFFIC CONTROL METHOD AND SYSTEM AND DECISION NETWORK ELEMENT

CROSS-REFERENCE TO RELATED APPLICATIONS

This application is a continuation of International Application No. PCT/CN2017/079457, filed on Apr. 5, 2017, which claims priority to Chinese Patent Application No. 201610546165.8, filed on Jul. 11, 2016. The disclosures of the aforementioned applications are hereby incorporated by reference in their entireties.

TECHNICAL FIELD

The present invention relates to the communications field, and specifically, to a service traffic control method and system, and a decision network element.

BACKGROUND

A common service processing system in a communications system includes a service initiation network element, a service access network element, and a service processing network element. The service initiation network element sends a service request (the service request may be a service-related access, obtaining, or write request) of a service to the service access network element. The service initiation network element is usually user equipment (UE) or a radio access network (RAN). The service access network element controls service access, that is, the service access network element determines whether to respond to the service request or discard the service request; and when responding to the service request, the service access network element notifies the service processing network element that the service request is to be responded to. The service processing network element processes the service request, and the service processing network element sends a service response message to the service access network element after completing the processing. The service access network element may notify the service initiation network element of a service processing result after learning about the response message.

In an aspect of controlling service traffic (the service traffic may be a quantity of service requests that are responded to), the service access network element obtains load information of a resource of the service processing network element. After the service access network element determines, according to the load information, that the resource of the service processing network element is overloaded, the service access network element performs traffic control on a service according to obtained traffic information (the traffic information is used to indicate a quantity of service requests to which the service access network element responds). Therefore, a problem that the resource of the service processing network element is overloaded is resolved, and system breakdown that occurs because the resource of the service processing network element is overloaded for a long time is prevented.

In the prior art, a service access network element obtains traffic information of a service, determines traffic control information of the service, and performs traffic control on the service according to the traffic control information. Therefore, the service access network element can perform traffic management on a service only of the network element. Consequently, a network element cannot perform traffic management on services of multiple network elements together.

SUMMARY

The present invention aims to provide a service traffic control method, a service traffic processing method, a resource load processing method, a service sampling network element, a resource sampling network element, an execution network element, a decision network element, and a service traffic control system, so that a decision network element performs traffic management on services of multiple service sampling network elements.

The foregoing objective and other objectives are achieved by using features in the independent claims. Further implementations are provided in the dependent claims, the specification, and the accompanying drawings.

According to a first aspect, a service traffic processing method is provided, the method may be executed by a service sampling network element, and the method includes:
obtaining reference traffic information of a target service, where a reference traffic information is used to indicate a quantity of service requests of the target service that are responded to by the service sampling network element in any sampling cycle, or the reference traffic information is used to indicate an average quantity of service requests of the target service that are responded to by the service sampling network element in the any sampling cycle, or the reference traffic information is used to indicate a quantity of service requests of the target service that are responded to by the service sampling network element at an obtaining time of the reference traffic information;
obtaining an address of a target decision network element corresponding to the target service; and
sending a traffic message to the target decision network element according to the address of the target decision network element, where the traffic message includes the reference traffic information.

A traffic information sampling cycle may also be understood as a traffic information obtaining cycle.

Obtaining the reference traffic information may also be referred to as sampling the reference traffic information, or may also be referred to as collecting the reference traffic information. The address of the decision network element corresponding to the target service may be preset.

The quantity of service requests of the target service that are responded to is obtained by subtracting a quantity of discarded service requests of the target service from a quantity of received service requests of the target service.

The reference traffic information may be further used to indicate a quantity that is separately corresponding to at least one time in a time period prior to the obtaining time of the reference traffic information and that is of service requests that are responded to. The time period may be any sampling cycle.

The average quantity of service requests of the target service that are responded to by the service sampling network element in the any sampling cycle may be obtained by averaging quantities of service requests of the target service that are responded to by the service sampling network element at at least two times in the any sampling cycle.

Traffic information of the target service may be obtained at an interval of a sampling cycle. A time between two adjacent sampling cycles is an obtaining time of the traffic information. The obtaining time is corresponding to an earlier sampling cycle in the two adjacent sampling cycles. The obtaining time of the reference traffic information may be corresponding to any sampling cycle. The obtaining time of the reference traffic information may be the latest among obtaining times of all obtained traffic information.

The service sampling network element obtains the reference traffic information, and sends the reference traffic information to the target decision network element, so that the target decision network element configured to determine traffic control information of the service can be separated from the service sampling network element configured to obtain the traffic information of the service. In this way, the target decision network element can perform traffic management on services of multiple service sampling network elements according to traffic information of the multiple service sampling network elements. The traffic control information is used to indicate a processing policy of a service request of the service. Performing traffic management may be sending the traffic control information to a target execution network element.

According to the first aspect, in a first possible implementation of the first aspect, the traffic message further includes service traffic identifier information of the target service, and the service traffic identifier information is used to identify the target service.

The service traffic identifier information may be preset.

The service traffic identifier information is added into the traffic message, so that different services can be distinguished. In this way, different traffic control information is determined for the different services.

According to the first implementation of the first aspect, in a second possible implementation of the first aspect, the service traffic identifier information includes at least one of a service type identifier of the target service, the address of the target decision network element, an address of the service sampling network element, duration of a sampling cycle of traffic information of the target service, a network layer protocol version of the target service, a transport layer protocol type of the target service, or a destination port number of a transport layer protocol of the target service.

A network layer may also be referred to as an IP (Internet Protocol) layer, the address of the target decision network element may be an IP address of the target decision network element, and the address of the service sampling network element may be an IP address of the service sampling network element.

In the second possible implementation of the first aspect, multiple solutions for distinguishing different services are provided. Therefore, not only a requirement for service distinguishing precision can be met, but also requirements of different traffic control implementation scenarios can be met because services may need to be distinguished in different dimensions in the different traffic control implementation scenarios.

According to any one of the first aspect or the foregoing implementations of the first aspect, in a third possible implementation of the first aspect, the traffic message further includes obtaining time information of the reference traffic information, where the obtaining time information is used to indicate the obtaining time of the reference traffic information, so that the target decision network element determines, according to the obtaining time information, whether the reference traffic information is repeated information.

Because repeated information is not information required by the target decision network element currently, determining of the repeated information may help reduce interference in determining the traffic control information by the target decision network element, and help prevent a waste and prevent unnecessary computing resources from being used.

According to any one of the first aspect or the foregoing implementations of the first aspect, in a fourth possible implementation of the first aspect, the traffic message further includes priority information of the target service.

The priority information may be preset.

The priority information is added into the traffic message, so that different traffic control information can be determined for services with different priorities.

According to any one of the first aspect or the foregoing implementations of the first aspect, in a fifth possible implementation of the first aspect, the sending a traffic message to the target decision network element according to the address of the target decision network element includes:
  determining, according to the address of the target decision network element, an address of a forwarding gateway corresponding to the target decision network element; and
  sending the traffic message to the forwarding gateway according to the address of the forwarding gateway, so that the forwarding gateway sends the traffic message to the target decision network element, where the traffic message includes the address of the target decision network element.

In the fifth possible implementation of the first aspect, cross-subnet traffic information obtaining can be implemented, so as to implement cross-subnet traffic control.

The traffic message sent by the forwarding gateway may include the address of the target decision network element, or may not include the address of the target decision network element.

According to any one of the first aspect or the foregoing implementations of the first aspect, in a sixth possible implementation of the first aspect, before the sending a traffic message to the target decision network element according to the address of the target decision network element, the method further includes:
  determining whether the address of the target decision network element is the address of the service sampling network element; and
  only when the address of the target decision network element is not the address of the service sampling network element, sending the traffic message to the target decision network element according to the address of the target decision network element.

When the address of the target decision network element is the address of the service sampling network element, a method provided in a fourth aspect except a method for obtaining the reference traffic information of the target service is executed on a basis that the reference traffic information of the target service is obtained.

It is determined whether the address of the target decision network element is the address of the service sampling network element, and a corresponding action is executed according to a determining result, so that the service sampling network element can be combined with the target decision network element. In this way, the service sampling network element can perform traffic management on a service of at least one of another service sampling network element or the service sampling network element according to at least one of traffic information of the another service sampling network element or the traffic information of the service sampling network element.

According to a second aspect, a resource load processing method is provided, the method may be executed by a resource sampling network element, and the method includes:

obtaining reference load information of a service resource that is of the resource sampling network element and that is used to process a target service, where the reference load information is used to indicate a usage status of the service resource;

obtaining an address of a target decision network element corresponding to the service resource; and sending a load message to the target decision network element according to the address of the target decision network element, where the load message includes the reference load information and resource identifier information of the service resource, and the resource identifier information is used to identify the service resource.

The resource identifier information may be preset.

The service resource that is of the resource sampling network element and that is used to process the target service may also be understood as a service resource that is of the resource sampling network element and that needs to be used to process the target service.

The address of the target decision network element corresponding to the service resource may be preset.

The usage status of the service resource may also be referred to as a load status of the service resource.

The reference load information may be used to indicate a usage status of the service resource at an obtaining time of the reference load information, may be used to indicate a usage status that is of the service resource and that is separately corresponding to at least one time in a time period prior to an obtaining time of reference load information, may be used to indicate a usage status of the service resource in a time period prior to an obtaining time of reference load information, or may be used to indicate an average usage status of the service resource in a time period prior to an obtaining time of reference load information. The time period may be any sampling cycle.

Load information of the service resource may be obtained at an interval of a sampling cycle. A time between two adjacent sampling cycles is an obtaining time of the load information. The obtaining time is corresponding to an earlier sampling cycle in the two adjacent sampling cycles. The obtaining time of the reference load information may be corresponding to any sampling cycle.

A load information sampling cycle may also be understood as a load information obtaining cycle.

The resource identifier information of the service resource is added into the load message, so that different resources can be distinguished. In this way, more bases are provided for determining traffic control information. The traffic control information is used to indicate a processing policy of a service request.

According to the second aspect, in a first possible implementation of the second aspect, the resource identifier information includes at least one of a resource type identifier of the service resource, the address of the target decision network element, an address of the resource sampling network element, or duration of a sampling cycle of load information of the service resource.

The address of the target decision network element may be an IP address of the target decision network element, and the address of the resource sampling network element may be an IP address of the resource sampling network element.

In a second possible implementation of the second aspect, multiple solutions for distinguishing different resources are provided. Therefore, not only a requirement for resource distinguishing precision can be met, but also requirements of different traffic control implementation scenarios can be met because resources may need to be distinguished in different dimensions in the different traffic control implementation scenarios.

According to the second aspect or the first implementation of the second aspect, in a second possible implementation of the second aspect, the load message further includes obtaining time information of the reference load information, so that the target decision network element determines, according to the obtaining time information, whether the reference load information is repeated information.

Because repeated information is not information required by the target decision network element currently, determining of the repeated information may help reduce interference in determining the traffic control information by the target decision network element, and help prevent a waste and prevent unnecessary computing resources from being used.

According to any one of the second aspect or the foregoing implementations of the second aspect, in a third possible implementation of the second aspect, the sending a load message to the target decision network element according to the address of the target decision network element includes:

determining, according to the address of the target decision network element, an address of a forwarding gateway corresponding to the target decision network element; and sending the load message to the forwarding gateway according to the address of the forwarding gateway, so that the forwarding gateway forwards the load message to the target decision network element, where the load message includes the address of the target decision network element.

The load message sent by the forwarding gateway may include the address of the target decision network element, or may not include the address of the target decision network element.

In the third possible implementation of the second aspect, cross-subnet load information obtaining can be implemented, so as to implement cross-subnet traffic control.

According to any one of the second aspect or the foregoing implementations of the second aspect, in a fourth possible implementation of the second aspect, before the sending a load message to the target decision network element according to the address of the target decision network element, the method further includes:

determining whether the address of the target decision network element is the address of the resource sampling network element; and only when the address of the target decision network element is not the address of the resource sampling network element, sending the load message to the target decision network element according to the address of the target decision network element.

When the address of the target decision network element is the address of the resource sampling network element, target traffic control information of the target service is determined according to the reference load information, where the target traffic control information is used to indicate a processing policy of a service request of the target service;

an address of an execution network element corresponding to the target service is obtained; and a traffic control message is sent to the execution network element according to the address of the execution network element, where the traffic control message includes the target traffic control information, and the target traffic control message is used to indicate the processing policy of the service request of the target service. Further, a method in any implementation of the fourth aspect may be executed. It is determined whether the address of the target decision network element is the address of the resource sampling network element, and a corresponding action is executed according to a determining result, so that the resource sampling network element can be combined with the target decision network element. In this way, the resource sampling network element obtains at least one of load information of another resource sampling network element or the load information of the resource sampling network element to determine the traffic control information.

According to a third aspect, a service traffic control method is provided, the method may be executed by an execution network element, and the method includes:

receiving a traffic control message of a target service from a decision network element, where the traffic control message includes target traffic control information, and the target traffic control information is used to indicate a processing policy of a service request of the target service; and executing, for the target service according to the target traffic control information, the processing policy that is of the service request of the target service and that is indicated by the target traffic control information.

The target traffic control information of the target service is received from the decision network element, so that the decision network element configured to determine the traffic control information of the service can be separated from the execution network element configured to execute, for the service according to the traffic control information, the processing policy that is of the service request and that is indicated by the traffic control information. In this way, the decision network element can control traffic control for multiple execution network elements.

According to the third aspect, in a first possible implementation of the third aspect, the traffic control message further includes determining time information of the target traffic control information, and only when a time indicated by the determining time information of the target traffic control information is later than a time indicated by determining time information of previous traffic control information, the processing policy that is of the service request of the target service and that is indicated by the target traffic control information is executed for the target service according to the target traffic control information, where the previous traffic control information is traffic control information received before the target traffic control information is received.

The previous traffic control information may be traffic control information whose determining time information indicates a latest time among all traffic control information received before the target traffic control information is received.

The traffic control message is discarded when the determining time information of the target traffic control information is the same as the determining time information of the previous traffic control information, or when the time indicated by the determining time information of the target traffic control information is earlier than the time indicated by the determining time information of the previous traffic control information.

It is ensured that the time indicated by the determining time information of the target traffic control information is later than the time indicated by the determining time information of the previous traffic control information, so that the processing policy that is of the service request of the target service and that is indicated by the traffic control information can be prevented from being repeatedly executed according to repeated traffic control information. In this way, a waste is prevented, unnecessary computing resources are prevented from being used, and timeliness of traffic control is improved.

According to the third aspect or the first implementation of the third aspect, in a second possible implementation of the third aspect, the traffic control message further includes an address of a target execution network element corresponding to the target service, and only when the address of the target execution network element corresponding to the target service is the same as an address of the execution network element, the processing policy that is of the service request and that is indicated by the target traffic control information is executed for the target service according to the target traffic control information.

When the address of the target execution network element corresponding to the target service is different from the address of the execution network element, the traffic control message is forwarded to the target execution network element according to the address of the target execution network element.

The target execution network element may be an execution network element in the fourth aspect.

The address of the target execution network element may be an IP address of the target execution network element, and the address of the execution network element may be an IP address of the execution network element.

The address of the target execution network element corresponding to the target service is added into the traffic control message, so that the traffic control message can be sent to a correct execution network element.

The traffic control message may include service control identifier information of the target service, and the service control identifier information may include at least one of a service type identifier of the target service, an address of the decision network element, the address of the execution network element, duration of a control cycle of traffic control information of the target service, a network layer protocol version of the target service, a transport layer protocol type of the target service, or a destination port number of a transport layer protocol of the target service.

Multiple solutions for distinguishing different services are provided. Therefore, not only a requirement for service distinguishing precision can be met, but also requirements of different traffic control implementation scenarios can be met because services may need to be distinguished in different dimensions in the different traffic control implementation scenarios.

According to the fourth aspect, a service traffic control method is provided, and the method includes:

obtaining reference load information of a service resource used to process a target service, where the reference load information is used to indicate a usage status of the service resource;

determining target traffic control information of the target service according to the reference load information, where the target traffic control information is used to indicate a processing policy of a service request of the target service;

obtaining an address of a target execution network element corresponding to the target service; and sending a traffic control message to the target execution network element according to the address of the target execution network element, where the traffic control message includes the target traffic control information, and the address of the target execution network element may be an IP address of the target execution network element.

An implementation of obtaining the reference load information of the service resource may be as follows: The decision network element may be the resource sampling network element in the second aspect, so as to obtain the reference load information. Alternatively, an implementation of obtaining the reference load information of the service resource may be as follows: A load message from a resource sampling network element is received, and the load message includes the reference load information.

The service resource used to process the target service may also be understood as a service resource that needs to be used to process the target service.

The address of the target execution network element corresponding to the target service may be preset.

The traffic control message is sent to the target execution network element according to the address of the target execution network element, so that the decision network element configured to determine the traffic control information of the service can be separated from the target execution network element configured to execute, for the service according to the traffic control information, the processing policy that is of the service request and that is indicated by the traffic control information. In this way, the decision network element can control traffic control for multiple target execution network elements.

According to the fourth aspect, in a first possible implementation of the fourth aspect, the target traffic control information includes at least one of a ratio of a quantity of service requests of the target service that need to be discarded in a next control cycle of a current control cycle to a quantity of service requests of the target service that need to be processed in the next control cycle of the current control cycle, or an upper limit of a quantity of service requests of the target service that need to be responded to in the next control cycle.

The next control cycle may be a next control cycle closely adjacent to the current control cycle.

The requests of the target service that need to be processed include the requests of the target service that need to be discarded. The quantity of requests of the target service that need to be responded to is obtained by subtracting the quantity of requests of the target service that need to be discarded from the quantity of requests of the target service that need to be processed. The requests of the target service that need to be processed may also be understood as received requests of the target service.

The ratio and the upper limit are set, so that the quantity of to-be-processed requests of the target service can be controlled. In this way, traffic control is implemented.

According to the first implementation of the fourth aspect, in a second possible implementation of the fourth aspect, when the target traffic control information includes the upper limit, the determining target traffic control information of the target service according to the reference load information includes:

obtaining reference traffic information of the target service, where a reference traffic information is used to indicate a quantity of service requests of the target service that are responded to by the service sampling network element in any sampling cycle, or the reference traffic information is used to indicate an average quantity of service requests of the target service that are responded to by the service sampling network element in the any sampling cycle, or the reference traffic information is used to indicate a quantity of service requests of the target service that are responded to by the service sampling network element at an obtaining time of the reference traffic information;

determining whether the reference load information meets a traffic control condition; and when the reference load information meets the traffic control condition, using, as the upper limit, a product of a control coefficient and the quantity that is of service requests of the target service and that is indicated by the reference traffic information, where the control coefficient is a real number greater than or equal to 0 and less than 1. Traffic control is performed by using the upper limit, so that a traffic control feedback mechanism can be implemented. In this way, traffic control is more stable. The control coefficient may be preset. A larger quantity indicated by the reference traffic information indicates more resources used in the service resource.

When the reference load information indicates a usage amount of the service resource, that the traffic control condition is met may be as follows: The usage amount is greater than or equal to a preset threshold. When the reference load information indicates a delay in processing the service request of the target service by the resource sampling network element, that the traffic control condition is met may be as follows: The processing delay is greater than or equal to a preset delay. When the reference load information indicates whether a usage amount is greater than or equal to a preset threshold, that the traffic control condition is met may be as follows: The reference load information indicates that the usage amount is greater than or equal to the preset threshold. When the reference load information indicates whether a processing delay is greater than or equal to a preset delay, the processing delay is greater than or equal to the preset delay. When the reference load information indicates whether the service resource is overloaded, that the traffic control condition is met may be as follows: The reference load information indicates that the service resource is overloaded.

When the reference load information does not meet the traffic control condition, the target traffic control information is used to instruct not to perform traffic control on the target service. The processing policy of the service request may instruct to perform traffic control on the target service, or may instruct not to perform traffic control on the target service. Performing traffic control on the target service may be limiting service traffic of the target service.

Alternatively, the determining target traffic control information of the target service according to the reference load information may include: determining whether the reference load information meets a traffic control condition; and when the reference load information meets the traffic control condition, using, as the target traffic control information, preset traffic control information corresponding to the reference load information that meets the traffic control condition.

Alternatively, when the target traffic control information includes the ratio, the determining target traffic control information of the target service according to the reference load information may include: determining whether the reference load information meets a traffic control condition; and when the reference load information meets the traffic control condition, determining the target traffic control information, and using a preset ratio as the ratio of the quantity of service requests of the target service that need to be discarded to the quantity of service requests of the target service that need to be processed.

An implementation of obtaining the reference traffic information of the target service may be as follows: The decision network element may be the service sampling network element in the first aspect, so as to obtain the reference traffic information.

The using, as the upper limit, a product of a control coefficient and the quantity that is indicated by the reference traffic information and that is of service requests of the target service that are responded to includes: obtaining priority information of the target service; determining, according to the priority information and a preset correspondence, the control coefficient corresponding to the priority information; and using, as the upper limit, the product of the control coefficient corresponding to the priority information and the quantity that is indicated by the reference traffic information and that is of service requests of the target service that are responded to.

An implementation of obtaining the priority information of the target service may be as follows: The decision network element may be the service sampling network element in the first aspect, so as to obtain the priority information. Alternatively, an implementation of obtaining the priority information of the target service may be as follows: A traffic message from the service sampling network element is received, and the traffic message includes the priority information.

According to the second implementation of the fourth aspect, in a third possible implementation of the fourth aspect, the obtaining reference traffic information of the target service includes: extracting the reference traffic information from a traffic message that is from the service sampling network element.

According to the third implementation of the fourth aspect, in a fourth possible implementation of the fourth aspect, the method is executed by a decision network element; the traffic message further includes an address of a target decision network element corresponding to the target service; and only when the address of the target decision network element corresponding to the target service is the same as an address of the decision network element, the product of the control coefficient and the quantity that is indicated by the reference traffic information and that is of service requests of the target service that are responded to is used as the upper limit.

Alternatively, when the address of the target decision network element corresponding to the target service is the same as the address of the decision network element, the reference load information of the service resource may be obtained. Alternatively, when the address of the target decision network element corresponding to the target service is the same as the address of the decision network element, it may be determined whether the reference load information meets the traffic control condition.

The address of the target decision network element corresponding to the target service is added into the traffic message, so that the traffic message can be sent to a correct decision network element.

The address of the target decision network element may be an IP address of the target decision network element, the address of the decision network element may be an IP address of the decision network element, and the target decision network element may be the target decision network element in the first aspect.

When the address of the target decision network element corresponding to the target service is different from the address of the decision network element, the traffic message is forwarded to the target decision network element according to the address of the target decision network element.

The traffic message may include the service traffic identifier information of the target service in the first aspect.

According to the third implementation of the fourth aspect or the fourth implementation of the fourth aspect, in a fifth possible implementation of the fourth aspect, the traffic message further includes obtaining time information of the reference traffic information; a time indicated by the obtaining time information is the obtaining time of the reference traffic information; and only when the obtaining time of the reference traffic information is later than an obtaining time of previous traffic information, the product of the control coefficient and the quantity that is of service requests of the target service and that is indicated by the reference traffic information is used as the upper limit, where the previous traffic information is traffic information received before the reference traffic information is received.

The previous traffic information may be traffic information whose obtaining time information indicates a latest time among all traffic information received before the reference traffic information is received.

Alternatively, when the time indicated by the obtaining time information of the reference traffic information is later than a time indicated by obtaining time information of the previous traffic information, the reference load information of the service resource may be obtained. Alternatively, when the time indicated by the obtaining time information of the reference traffic information is later than a time indicated by obtaining time information of the previous traffic information, it may be determined whether the reference load information meets the traffic control condition.

The traffic message is discarded when the obtaining time information of the reference traffic information is the same as the obtaining time information of the previous traffic information, or when the time indicated by the obtaining time information of the reference traffic information is earlier than the time indicated by the obtaining time information of the previous traffic information.

It is ensured that the time indicated by the obtaining time information of the reference traffic information is later than the time indicated by the obtaining time information of the previous traffic information, so that the upper limit can be prevented from being determined according to repeated traffic information. In this way, a waste is prevented, unnecessary computing resources are prevented from being used, and timeliness and accuracy of traffic control are improved.

According to any one of the fourth aspect or the foregoing implementations of the fourth aspect, in a sixth possible implementation of the fourth aspect, the obtaining reference load information of a service resource of the resource sampling network element includes:

extracting the reference load information from a load message that is from the resource sampling network element.

According to the sixth implementation of the fourth aspect, in a seventh possible implementation of the fourth aspect, the method is executed by the decision network element; the load message further includes an address of a target decision network element corresponding to the service resource; and only when the address of the target decision network element corresponding to the service resource is the same as the address of the decision network element, the target traffic control information of the target service is determined according to the reference load information.

The address of the target decision network element corresponding to the service resource is added into the load message, so that the load message can be sent to a correct decision network element.

The address of the target decision network element may be an IP address of the target decision network element, and the target decision network element may be the target decision network element in the second aspect.

When the address of the target decision network element corresponding to the service resource is different from the address of the decision network element, the load message is forwarded to the target decision network element according to the address of the target decision network element.

The load message may include the resource identifier information of the service resource in the second aspect.

According to the sixth implementation of the fourth aspect or the seventh implementation of the fourth aspect, in an eighth possible implementation of the fourth aspect, the load message further includes obtaining time information of the reference load information; and only when a time indicated by the obtaining time information of the reference load information is later than a time indicated by obtaining time information of previous load information, the target traffic control information of the target service is determined according to the reference load information, where the previous load information is load information received before the reference load information is received.

The previous load information may be load information whose obtaining time information indicates a latest time among all load information received before the reference load information is received.

The load message is discarded when the obtaining time information of the reference load information is the same as the obtaining time information of the previous load information, or when the time indicated by the obtaining time information of the reference load information is earlier than the time indicated by the obtaining time information of the previous load information.

It is ensured that the time indicated by the obtaining time information of the reference load information is later than the time indicated by the obtaining time information of the previous load information, so that the traffic control information of the service can be prevented from being determined according to repeated load information. In this way, a waste is prevented, unnecessary computing resources are prevented from being used, and timeliness and accuracy of traffic control are improved.

According to any one of the fourth aspect or the foregoing implementations of the fourth aspect, in a ninth possible implementation of the fourth aspect, the traffic control message further includes service control identifier information of the target service, and the service control identifier information is used to identify the target service. The service control identifier information in the fourth aspect may be the same as or may be different from the service traffic identifier information in the first aspect.

According to the ninth implementation of the fourth aspect, in a tenth possible implementation of the fourth aspect, the service control identifier information includes at least one of a service type identifier of the target service, the address of the decision network element, the address of the target execution network element, duration of a control cycle of traffic control information of the target service, a network layer protocol version of the target service, a transport layer protocol type of the target service, or a destination port number of a transport layer protocol of the target service.

According to any one of the fourth aspect or the foregoing implementations of the fourth aspect, in an eleventh possible implementation of the fourth aspect, the traffic control message further includes determining time information of the target traffic control information, so that the target execution network element determines, according to the determining time information, whether the target traffic control information is repeated information.

According to any one of the fourth aspect or the foregoing implementations of the fourth aspect, in a twelfth possible implementation of the fourth aspect, the sending a traffic control message to the target execution network element according to the address of the target execution network element includes:
  determining, according to the address of the target execution network element, an address of a forwarding gateway corresponding to the target execution network element; and
  sending the traffic control message to the forwarding gateway according to the address of the forwarding gateway, so that the forwarding gateway forwards the traffic control message to the target execution network element, where the traffic control message includes the address of the target execution network element. Therefore, cross-subnet traffic control is implemented.

The traffic control message received by the forwarding gateway may include the address of the target execution network element. The traffic control message sent by the forwarding gateway may include the address of the target execution network element, or may not include the address of the target execution network element.

According to any one of the fourth aspect or the foregoing implementations of the fourth aspect, in a thirteenth possible implementation of the fourth aspect, before the sending a traffic control message to the target execution network element according to the address of the target execution network element, the method further includes:
  determining whether the address of the target execution network element is the address of the decision network element; and
  only when the address of the target execution network element is not the address of the decision network element, sending the traffic control message to the target execution network element according to the address of the target execution network element.

When the address of the target execution network element is the address of the decision network element, the processing policy that is of the service request of the target service and that is indicated by the target traffic control information is executed for the target service according to the target traffic control information.

It is determined whether the address of the target execution network element is the address of the decision network element, and a corresponding action is executed according to a determining result, so that the target execution network element can be combined with the decision network element.

According to a fifth aspect, a service sampling network element is provided, and the network element includes:

a traffic obtaining unit, configured to obtain reference traffic information of a target service, where a reference traffic information is used to indicate a quantity of service requests of the target service that are responded to by the service sampling network element in any sampling cycle, or the reference traffic information is used to indicate an average quantity of service requests of the target service that are responded to by the service sampling network element in the any sampling cycle, or the reference traffic information is used to indicate a quantity of service requests of the target service that are responded to by the service sampling network element at an obtaining time of the reference traffic information;

an address obtaining unit, configured to obtain an address of a target decision network element corresponding to the target service; and a sending unit, configured to send a traffic message to the target decision network element according to the address of the target decision network element that is obtained by the address obtaining network element, where the traffic message includes the reference traffic information obtained by the traffic obtaining unit.

According to the fifth aspect, in a first possible implementation of the fifth aspect, the traffic message further includes service traffic identifier information of the target service, and the service traffic identifier information is used to identify the target service.

According to the first implementation of the fifth aspect, in a second possible implementation of the fifth aspect, the service traffic identifier information includes at least one of a service type identifier of the target service, the address of the target decision network element, an address of the service sampling network element, duration of a sampling cycle of traffic information of the target service, a network layer protocol version of the target service, a transport layer protocol type of the target service, or a destination port number of a transport layer protocol of the target service.

According to any one of the fifth aspect or the foregoing implementations of the fifth aspect, in a third possible implementation of the fifth aspect, the traffic message further includes obtaining time information of the reference traffic information, where the obtaining time information is used to indicate the obtaining time of the reference traffic information, so that the target decision network element determines, according to the obtaining time information, whether the reference traffic information is repeated information.

According to any one of the fifth aspect or the foregoing implementations of the fifth aspect, in a fourth possible implementation of the fifth aspect, the traffic message further includes priority information of the target service. According to any one of the fifth aspect or the foregoing implementations of the fifth aspect, in a fifth possible implementation of the fifth aspect, the sending unit is configured to:

determine, according to the address of the target decision network element, an address of a forwarding gateway corresponding to the target decision network element; and send the traffic message to the forwarding gateway according to the address of the forwarding gateway, so that the forwarding gateway forwards the traffic message to the target decision network element, where the traffic message includes the address of the target decision network element. According to any one of the fifth aspect or the foregoing implementations of the fifth aspect, in a sixth possible implementation of the fifth aspect, before sending the traffic message to the target decision network element according to the address of the target decision network element, the sending unit is further configured to:

determine whether the address of the target decision network element is the address of the service sampling network element; and only when the address of the target decision network element is not the address of the service sampling network element, send the traffic message to the target decision network element according to the address of the target decision network element.

According to a sixth aspect, a resource sampling network element is provided, and the network element includes:

a load obtaining unit, configured to obtain reference load information of a service resource that is of the resource sampling network element and that is used to process a target service, where the reference load information is used to indicate a usage status of the service resource;

an address obtaining unit, configured to obtain an address of a target decision network element corresponding to the service resource; and a sending unit, configured to send a load message to the target decision network element according to the address of the target decision network element that is obtained by the address obtaining unit, where the load message includes the reference load information obtained by the load obtaining unit and preset resource identifier information of the service resource, and the resource identifier information is used to identify the service resource.

According to the sixth aspect, in a first possible implementation of the sixth aspect, the resource identifier information includes at least one of a resource type identifier of the service resource, the address of the target decision network element, an address of the resource sampling network element, or duration of a sampling cycle of load information of the service resource.

According to the sixth aspect or the first implementation of the sixth aspect, in a second possible implementation of the sixth aspect, the load message further includes obtaining time information of the reference load information, so that the target decision network element determines, according to the obtaining time information, whether the reference load information is repeated information.

According to any one of the sixth aspect or the foregoing implementations of the sixth aspect, in a third possible implementation of the sixth aspect, the sending unit is configured to:

determine, according to the address of the target decision network element, an address of a forwarding gateway corresponding to the target decision network element; and send the load message to the forwarding gateway according to the address of the forwarding gateway, so that the forwarding gateway forwards the load message to the target decision network element, where the load message includes the address of the target decision network element.

According to any one of the sixth aspect or the foregoing implementations of the sixth aspect, in a fourth possible implementation of the sixth aspect, before sending the load message to the target decision network element according to the address of the target decision network element, the sending unit is further configured to:

determine whether the address of the target decision network element is the address of the resource sampling network element; and only when the address of the target decision network element is not the address of the resource sampling network element, send the load message to the target decision network element according to the address of the target decision network element.

According to a seventh aspect, an execution network element is provided, and the network element includes:

a receiving unit, configured to receive a traffic control message of a target service from a decision network element, where the traffic control message includes target traffic control information, and the target traffic control information is used to indicate a processing policy of a service request of the target service; and a processing unit, configured to execute, for the target service according to the target traffic control information received by the receiving unit, the processing policy that is of the service request of the target service and that is indicated by the target traffic control information.

According to the seventh aspect, in a first possible implementation of the seventh aspect, the traffic control message further includes determining time information of the target traffic control information; and only when a time indicated by the determining time information of the target traffic control information is later than a time indicated by determining time information of previous traffic control information, the processing unit is configured to execute, for the target service according to the target traffic control information, the processing policy that is of the service request of the target service and that is indicated by the target traffic control information, where the previous traffic control information is traffic control information received before the target traffic control information is received.

According to the seventh aspect or the first implementation of the seventh aspect, in a second possible implementation of the seventh aspect, the traffic control message further includes an address of a target execution network element corresponding to the target service; and only when the address of the target execution network element corresponding to the target service is the same as an address of the execution network element, the processing unit is configured to execute, for the target service according to the target traffic control information, the processing policy that is of the service request of the target service and that is indicated by the target traffic control information.

According to an eighth aspect, a decision network element is provided, and the network element includes:

a load obtaining unit, configured to obtain reference load information of a service resource used to process a target service, where the reference load information is used to indicate a usage status of the service resource;

a processing unit, configured to determine target traffic control information of the target service according to the reference load information obtained by the load obtaining unit, where the target traffic control information is used to indicate a processing policy of a service request of the target service;

an address obtaining unit, configured to obtain an address of a target execution network element corresponding to the target service; and a sending unit, configured to send a traffic control message to the target execution network element according to the address of the target execution network element that is obtained by the address obtaining unit, where the traffic control message includes the target traffic control information determined by the processing unit.

According to the eighth aspect, in a first possible implementation of the eighth aspect, the target traffic control information includes at least one of a ratio of a quantity of service requests of the target service that need to be discarded in a next control cycle of a current control cycle to a quantity of service requests of the target service that need to be processed in the next control cycle of the current control cycle, or an upper limit of a quantity of service requests of the target service that need to be responded to in the next control cycle.

According to the first implementation of the eighth aspect, in a second possible implementation of the eighth aspect, when the target traffic control information includes the upper limit, the decision network element further includes a traffic obtaining unit, and the traffic obtaining unit is configured to:

obtain reference traffic information of the target service, where a reference traffic information is used to indicate a quantity of service requests of the target service that are responded to by the service sampling network element in any sampling cycle, or the reference traffic information is used to indicate an average quantity of service requests of the target service that are responded to by the service sampling network element in the any sampling cycle, or the reference traffic information is used to indicate a quantity of service requests of the target service that are responded to by the service sampling network element at an obtaining time of the reference traffic information; and correspondingly, the processing unit is configured to:

determine whether the reference load information meets a traffic control condition; and when the reference load information meets the traffic control condition, use, as the upper limit, a product of a control coefficient and the quantity that is of service requests of the target service and that is indicated by the reference traffic information, where the control coefficient is a real number greater than or equal to 0 and less than 1.

According to the second implementation of the eighth aspect, in a third possible implementation of the eighth aspect, the traffic obtaining unit is configured to:

extract the reference traffic information from a traffic message that is from the service sampling network element.

According to the third implementation of the eighth aspect, in a fourth possible implementation of the eighth aspect, the traffic message further includes an address of a target decision network element corresponding to the target service; and only when the address of the target decision network element corresponding to the target service is the same as an address of the decision network element, the processing unit is configured to use, as the upper limit, the product of the control coefficient and the quantity that is indicated by the reference traffic information and that is of service requests of the target service that are responded to.

According to the third implementation of the eighth aspect or the fourth implementation of the eighth aspect, in a fifth possible implementation of the eighth aspect, the traffic message further includes obtaining time information of the reference traffic information; a time indicated by the obtaining time information is the obtaining time of the reference traffic information; and only when the obtaining time of the reference traffic information is later than an obtaining time of previous traffic information, the processing unit is configured to use, as the upper limit, the product of the control coefficient and the quantity that is of service requests of the target service and that is indicated by the reference traffic information, where the previous traffic information is traffic information received before the reference traffic information is received.

According to any one of the eighth aspect or the foregoing implementations of the eighth aspect, in a sixth possible implementation of the eighth aspect, the load obtaining unit is configured to:

extract the reference load information from a load message that is from a resource sampling network element.

According to the sixth implementation of the eighth aspect, in a seventh possible implementation of the eighth aspect, the load message further includes an address of a target decision network element corresponding to the service resource, and only when the address of the target decision network element corresponding to the service resource is the same as the address of the decision network element, the processing unit is configured to determine the target traffic control information of the target service according to the reference load information.

According to the sixth implementation of the eighth aspect or the seventh implementation of the eighth aspect, in an eighth possible implementation of the eighth aspect, the load message further includes obtaining time information of the reference load information, and only when a time indicated by the obtaining time information of the reference load information is later than a time indicated by obtaining time information of previous load information, the processing unit is configured to determine the target traffic control information of the target service according to the reference load information, where the previous load information is load information received before the reference load information is received.

According to any one of the eighth aspect or the foregoing implementations of the eighth aspect, in a ninth possible implementation of the eighth aspect, the traffic control message further includes service control identifier information of the target service, and the service control identifier information is used to identify the target service.

According to the ninth implementation of the eighth aspect, in a tenth possible implementation of the eighth aspect, the service control identifier information includes at least one of a service type identifier of the target service, the address of the decision network element, the address of the target execution network element, duration of a control cycle of traffic control information of the target service, a network layer protocol version of the target service, a transport layer protocol type of the target service, or a destination port number of a transport layer protocol of the target service.

According to any one of the eighth aspect or the foregoing implementations of the eighth aspect, in an eleventh possible implementation of the eighth aspect, the traffic control message further includes determining time information of the target traffic control information, so that the target execution network element determines, according to the determining time information, whether the target traffic control information is repeated information.

According to any one of the eighth aspect or the foregoing implementations of the eighth aspect, in a twelfth possible implementation of the eighth aspect, the sending unit is configured to:

determine, according to the address of the target execution network element, an address of a forwarding gateway corresponding to the target execution network element; and send the traffic control message to the forwarding gateway according to the address of the forwarding gateway, so that the forwarding gateway forwards the traffic control message to the target execution network element, where the traffic control message includes the address of the target execution network element.

According to any one of the eighth aspect or the foregoing implementations of the eighth aspect, in a thirteenth possible implementation of the eighth aspect, before sending the traffic control message to the target execution network element according to the address of the target execution network element, the sending unit is further configured to:

determine whether the address of the target execution network element is the address of the decision network element; and only when the address of the target execution network element is not the address of the decision network element, the sending unit sends the traffic control message to the target execution network element according to the address of the target execution network element.

According to a ninth aspect, a service sampling network element is provided, and the network element includes a processor and a memory; the memory is configured to store code; and by reading the code stored in the memory, the processor executes the method provided in the first aspect.

According to a tenth aspect, a resource sampling network element is provided, and the network element includes a processor and a memory; the memory is configured to store code; and by reading the code stored in the memory, the processor executes the method provided in the second aspect.

According to an eleventh aspect, an execution network element is provided, and the network element includes a processor and a memory; the memory is configured to store code; and by reading the code stored in the memory, the processor executes the method provided in the third aspect.

According to a twelfth aspect, a decision network element is provided, and the network element includes a processor and a memory; the memory is configured to store code; and by reading the code stored in the memory, the processor executes the method provided in the fourth aspect.

According to a thirteenth aspect, a computer storage medium is provided, and the computer storage medium is configured to store a computer software instruction executed by the processor in the ninth aspect, to execute the method provided in the first aspect.

According to a fourteenth aspect, a computer storage medium is provided, and the computer storage medium is configured to store a computer software instruction executed by the processor in the tenth aspect, to execute the method provided in the second aspect.

According to a fifteenth aspect, a computer storage medium is provided, and the computer storage medium is configured to store a computer software instruction executed by the processor in the eleventh aspect, to execute the method provided in the third aspect.

According to a sixteenth aspect, a computer storage medium is provided, and the computer storage medium is configured to store a computer software instruction executed by the processor in the twelfth aspect, to execute the method provided in the fourth aspect.

According to a seventeenth aspect, a service traffic control system is provided, and the system includes the service sampling network element provided in the fifth aspect, the resource sampling network element provided in the sixth aspect, the execution network element provided in the seventh aspect, and the decision network element provided in the eighth aspect.

According to an eighteenth aspect, a service traffic control system is provided, and the system includes the service sampling network element provided in the ninth aspect, the resource sampling network element provided in the tenth aspect, the execution network element provided in the eleventh aspect, and the decision network element provided in the twelfth aspect.

According to a nineteenth aspect, a service traffic control system is provided, and the system includes:
a resource sampling network element, configured to: obtain reference load information of a service resource that is of the resource sampling network element and that is used to process a target service, where the reference load information is used to indicate a usage status of the service resource; and send a load message to a decision network element, where the load message includes the reference load information;
the decision network element, configured to: determine target traffic control information of the target service according to the reference load information obtained by the resource sampling network element, where the target traffic control information is used to indicate a processing policy of a service request of the target service; and send a traffic control message to an execution network element, where the traffic control message includes the target traffic control information; and
the execution network element, configured to execute, for the target service according to the target traffic control information determined by the decision network element, the processing policy that is of the service request of the target service and that is indicated by the target traffic control information.

That the load message is sent to the decision network element may be as follows: When an address of a target decision network element corresponding to the service resource is different from an address of the decision network element, the load message is sent to the target decision network element according to the address of the target decision network element corresponding to the service resource. Correspondingly, that the reference load information is extracted from the load message that is from the resource sampling network element may be as follows: When the address of the target decision network element is the same as the address of the decision network element, the reference load information is extracted from the load message that is from the resource sampling network element. For content of the target decision network element corresponding to the service resource, refer to the content that is in the second aspect and the fourth aspect and that is related to the target decision network element corresponding to the service resource. Details are not described herein again.

That the traffic control message is sent to the execution network element may be as follows: When an address of a target execution network element corresponding to the target service is different from an address of the execution network element, the traffic control message is sent to the target execution network element according to the preset address of the target execution network element corresponding to the target service. Correspondingly, that the target traffic control information is extracted from the traffic control message that is of the target service and that is from the decision network element may be as follows: When the address of the target execution network element corresponding to the target service is the same as the address of the execution network element, the target traffic control information is extracted from the traffic control message that is of the target service and that is from the decision network element. For content of the target execution network element corresponding to the target service, refer to the content that is in the third aspect and the fourth aspect and that is related to the target execution network element corresponding to the target service. Details are not described herein again.

For content of the load message, refer to the content that is in the second aspect and the fourth aspect and that is related to the load message. Details are not described herein again.

For content of the resource sampling network element, refer to the content of the resource sampling network element in the sixth aspect. Details are not described herein again.

For content of the execution network element, refer to the content of the execution network element in the seventh aspect. Details are not described herein again.

For content of the decision network element, refer to the content of the decision network element in the eighth aspect. Details are not described herein again.

For content of the traffic control message, refer to the content that is in the third aspect and the fourth aspect and that is related to the traffic control message. Details are not described herein again.

According to the first aspect, in a first possible implementation of the first aspect, the target traffic control information includes at least one of a ratio of a quantity of service requests of the target service that need to be discarded in a next control cycle of a current control cycle to a quantity of service requests of the target service that need to be processed in the next control cycle of the current control cycle, or an upper limit of a quantity of service requests of the target service that need to be responded to in the next control cycle.

According to the first implementation of the first aspect, in a second possible implementation of the first aspect,
the system further includes a service sampling network element, configured to: when the target traffic control information includes the upper limit, obtain reference traffic information of the target service, where a reference traffic information is used to indicate a quantity of service requests of the target service that are responded to by the service sampling network element in any sampling cycle, or the reference traffic information is used to indicate an average quantity of service requests of the target service that are responded to by the service sampling network element in the any sampling cycle, or the reference traffic information is used to indicate a quantity of service requests of the target service that are responded to by the service sampling network element at an obtaining time of the reference traffic information; and send a traffic message to the decision network element, where the traffic message includes the reference traffic information; and
correspondingly, the decision network element is configured to:
determine whether the reference load information meets a traffic control condition; and
when the reference load information meets the traffic control condition, use, as the upper limit, a product of a control coefficient and the quantity that is indicated by the reference traffic information obtained by the service sampling network element and that is of service requests that are responded to, where the control coefficient is a real number greater than or equal to 0 and less than 1.

That the traffic message is sent to the decision network element may be as follows: When an address of a target decision network element corresponding to the target service is different from the address of the decision network element, the traffic message is sent, according to the address of the target decision network element corresponding to the target service, to the target decision network element corresponding to the target service. Correspondingly, that the reference traffic information is extracted from the traffic message that is from the service sampling network element may be as follows: When the address of the target decision network element corresponding to the target service is the same as the address of the decision network element, the reference traffic information is extracted from the traffic message that is from the service sampling network element. For content of the target decision network element corresponding to the target service, refer to the content that is in the first aspect and the fourth aspect and that is related to the target decision network element corresponding to the target service. Details are not described herein again.

For content of the service sampling network element, refer to the content of the service sampling network element in the fifth aspect. Details are not described herein again.

For content of the traffic message, refer to the content of the traffic message in the first aspect and the fourth aspect. Details are not described herein again.

For the content of the traffic control message, refer to the content of the traffic control message in the third aspect and the fourth aspect. The details are not described herein again.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention.

To perform service traffic control on multiple network elements together, in the embodiments of the present invention, a service access network element is divided into a service sampling network element, a decision network element, and an execution network element. In the embodiments of the present invention, a service processing network element is configured to obtain load information of a resource of the service processing network element. Therefore, a resource sampling network element may be the service processing network element.

Figure 1:
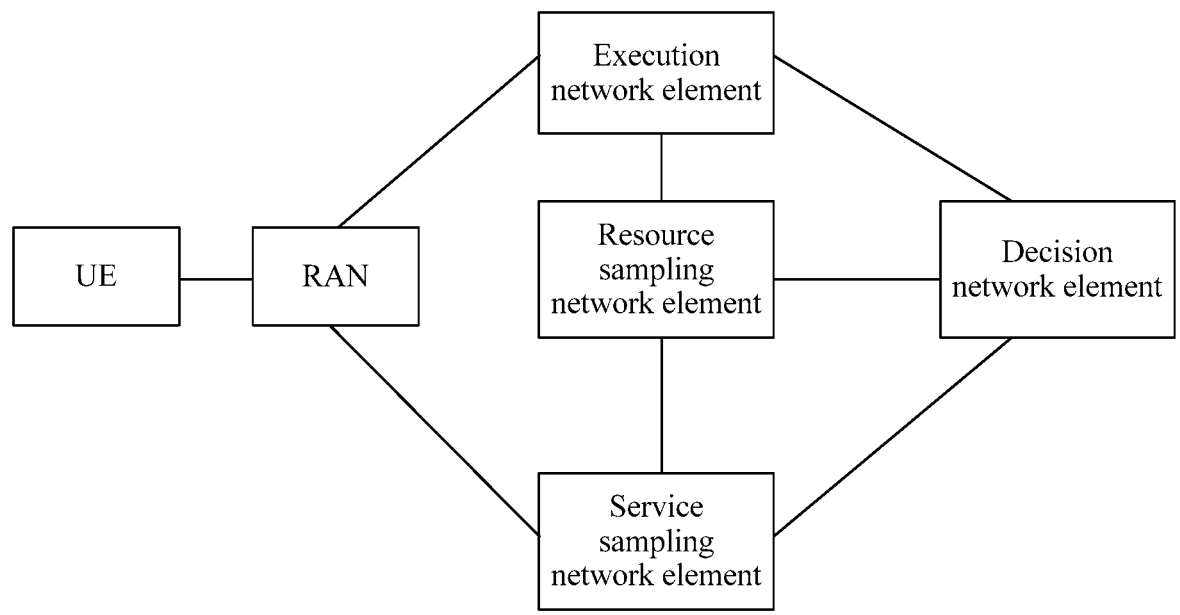
FIG. 1 is a schematic network diagram of a service traffic control system according to an embodiment of the present invention.

FIG. 1 is a schematic network diagram of a service traffic control system according to an embodiment of the present invention. As shown in FIG. 1, the system includes a service sampling network element, an execution network element, a resource sampling network element, and a decision network element. It should be understood that the system may further include a service initiation network element. FIG. 1 is an implementation solution in which the system provided in this embodiment of the present invention is applied to a core network (CN). When the system provided in this embodiment of the present invention is applied to the core network, the service initiation network element may be a radio access network (RAN). The system may further include user equipment (UE). However, the present invention is not limited thereto.

The service sampling network element may be configured to sample reference traffic information of a target service. The reference traffic information is used to indicate a quantity of service requests of the target service that are responded to by the service sampling network element in any sampling cycle, or the reference traffic information is used to indicate an average quantity of service requests of the target service that are responded to by the service sampling network element in the any sampling cycle, or the reference traffic information is used to indicate a quantity of service requests of the target service that are responded to by the service sampling network element at an obtaining time of the reference traffic information. When responding to a service request of the target service, the service sampling network element needs to communicate with the resource sampling network element, and the resource sampling network element needs to perform corresponding processing. Therefore, when an excessively large quantity of service requests of the target service are responded to, a service resource that is of the resource sampling network element and that is used to process the target service may be excessively used. Therefore, the resource sampling network element needs to obtain reference load information of the service resource of the resource sampling network element, and notifies the decision network element of the reference load information. The reference load information is used to indicate a usage status of the service resource. The decision network element determines a processing policy of a service request of the target service according to the reference load information, so that the execution network element may execute the processing policy for the target service according to the processing policy. Specifically, the execution network element may control a quantity of service requests of the target service that are to be responded to. The service sampling network element and the execution network element may be a same network element, or may be different network elements. When the service sampling network element and the execution network element are different network elements, an upstream/downstream relationship between services may be reflected. For example, only when the execution network element responds to a service request of a service A, the sampling network element can receive a request of a service B. Therefore, the execution network element controls a quantity of service requests of the service A that are responded to, so that a quantity of service requests of the service B that are responded to can be controlled. Therefore, the execution network element corresponding to the service A may be different from the service sampling network element corresponding to the service A.

The RAN may include a NodeB (NODE B) and a radio network controller (RNC), and is mainly configured to control the UE to access a mobile communications network. The UE is connected to the core network by using the RAN. Functions of the service sampling network element and the execution network element may be implemented by a service processing unit (SPU). Correspondingly, the SPU and the RAN may establish a connection by using a versatile interface unit (VIU). The VIU may include a router (Router) and a load balancer (Load Balancer). A function of the resource sampling network element may be implemented by using a database (DB). The SPU establishes communication with the VIU and the DB, so as to provide functions such as IP packet access and distribution, protocol parsing, user subscription information parsing, a policy parsing engine, bandwidth control and management, charging management, user session management, bill generation, and charging information generation. In the system, there may be at least two SPUs, there may be at least two DBs, and there may be a many-to-many connection relationship between the SPUs and the DBs. The SPUs may be connected to each other. A function of the decision network element may be implemented by the SPU, or may be implemented by an operation and maintenance unit (OMU). The OMU establishes communication with the VIU, the DB, and the SPU, so as to control the VIU, the DB, and the SPU.

With reference to the service traffic control system provided in FIG. 1, the following specifically describes a method executed by the service sampling network element, the resource sampling network element, the execution network element, and the decision network element that are in the system.

Figure 2:
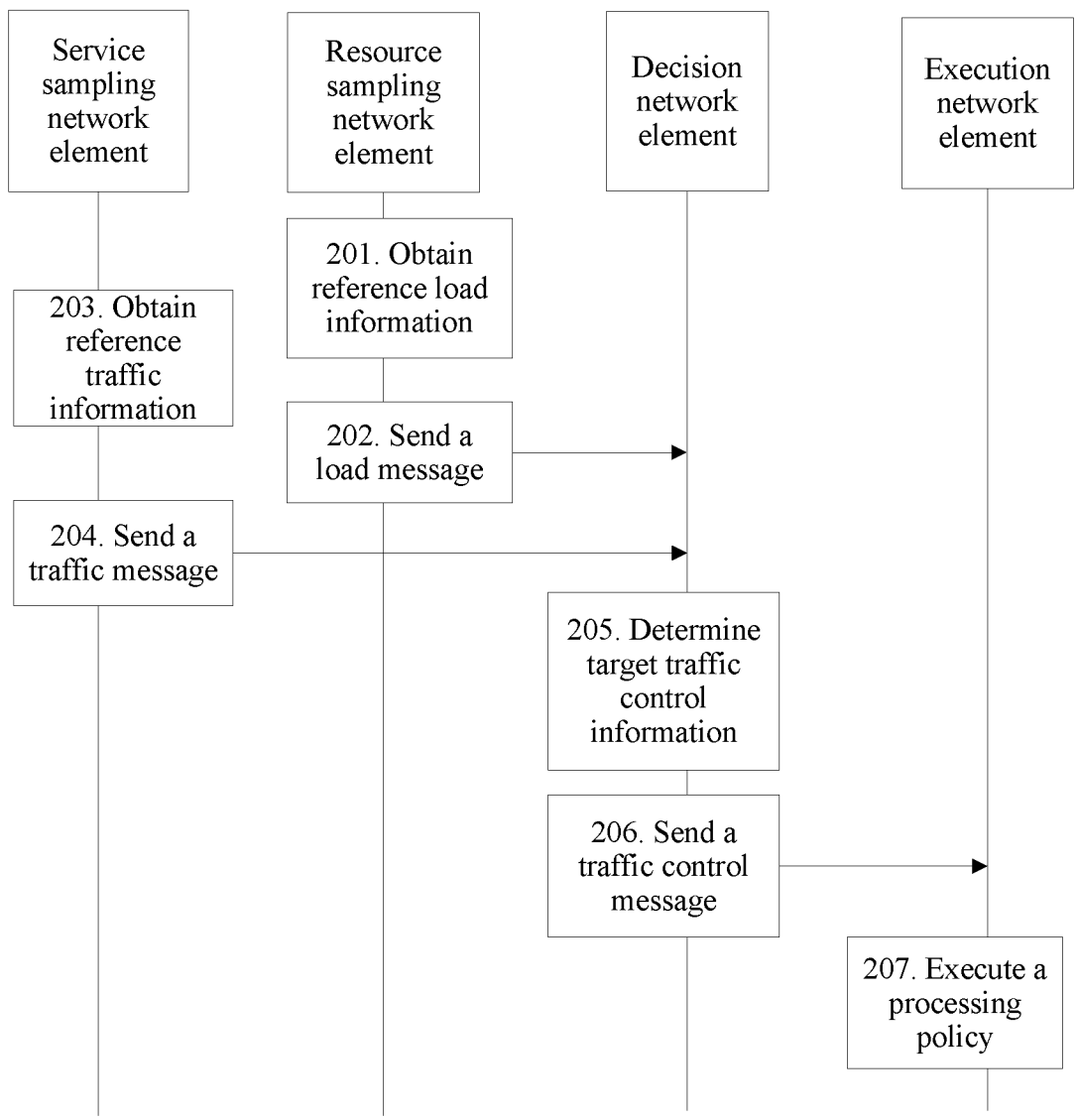
FIG. 2 is a schematic flowchart of a service traffic control method according to an embodiment of the present invention.

FIG. 2 is a schematic flowchart of a service traffic control method according to an embodiment of the present invention. A network element in FIG. 2 includes a service sampling network element, a resource sampling network element, a decision network element, and an execution network element. In a possible implementation, a network element may serve as any one of the service sampling network element, the resource sampling network element, the decision network element, or the execution network element; or the network element may serve as at least one of the service sampling network element, the resource sampling network element, the decision network element, or the execution network element. For example, the network element may serve as both the service sampling network element and the execution network element, or the network element may serve as both the service sampling network element and the resource sampling network element, or the network element may serve as both the resource sampling network element and the execution network element, or the network element may serve as both the service sampling network element and the decision network element, or the network element may simultaneously serve as the service sampling network element, the decision network element, and the execution network element. The method includes the following steps.

Step 201: The resource sampling network element obtains reference load information. Specifically, the resource sampling network element obtains the reference load information of a service resource that is of the resource sampling network element and that is used to process a target service. The reference load information is used to indicate a usage status of the service resource. Specifically, the reference load information may indicate a usage amount of the service resource. The service resource may be a central processing unit CPU, may be a memory, or may be a buffer. Alternatively, the reference load information may indicate a delay in processing a service request of the target service by the resource sampling network element. Alternatively, the reference load information may be an identifier used to indicate whether the service resource is overloaded. Alternatively, the reference load information may be an identifier used to indicate whether a usage amount is greater than or equal to a preset threshold, or may be an identifier used to indicate whether a processing delay is greater than or equal to a preset delay.

Step 202: The resource sampling network element sends a load message. Specifically, the resource sampling network element may obtain an address of a target decision network element corresponding to the service resource, and send, according to the address of the target decision network element corresponding to the service resource, the load message to the target decision network element corresponding to the service resource. The load message includes the reference load information and resource identifier information of the service resource, and the resource identifier information is used to identify the service resource.

When a forwarding gateway needs to be used for forwarding, an address of a forwarding gateway corresponding to the target decision network element may be determined according to the address of the target decision network element. The load message is sent to the forwarding gateway according to the address of the forwarding gateway, so that the forwarding gateway forwards the load message to the target decision network element corresponding to the service resource. The load message may include the address of the target decision network element corresponding to the service resource.

When the address of the target decision network element corresponding to the service resource is obtained, it may be determined whether the address of the target decision network element corresponding to the service resource is an address of the resource sampling network element. When the address of the target decision network element corresponding to the service resource is not the address of the resource sampling network element, the load message is sent, according to the address of the target decision network element corresponding to the service resource, to the target decision network element corresponding to the service resource. When the address of the target decision network element corresponding to the service resource is the address of the resource sampling network element, it indicates that the target decision network element and the resource sampling network element are a same network element. On a basis that the resource sampling network element obtains the reference load information, the resource sampling network element may not need to send the load message to the target decision network element corresponding to the service resource, and may directly serve as the target decision network element corresponding to the service resource to execute an action executed by the target decision network element corresponding to the service resource.

The resource identifier information may be preset.

In a specific implementation, the resource identifier information may include at least one of a resource type identifier of the service resource, the address of the target decision network element, the address of the resource sampling network element, or duration of a sampling cycle of load information of the service resource. When a value of the sampling cycle of the load information of the service resource is a default preset value, the resource identifier information may not include the sampling cycle of the load information of the service resource. The resource type identifier may be used to identify at least one of the CPU, the memory, or the buffer. Duration between two adjacent times for obtaining the load information of the service resource is the sampling cycle of the load information of the service resource. The reference load information may indicate a load status of the service resource at an obtaining time of the reference load information, or may indicate an average load status of the service resource in a time period that is prior to an obtaining time of the reference load information and whose duration is the sampling cycle.

In a specific implementation, the load message may further include obtaining time information of the reference load information, so that the target decision network element determines, according to the obtaining time information, whether the reference load information is repeated information. The obtaining time information of the reference load information may be a time, may be a sequence number of the reference load information, or may be a value of a counter configured to count the load information.

It should be noted that, when the resource sampling network element and the target decision network element are the same network element by default, on a basis that the resource sampling network element obtains the reference load information, the resource sampling network element may not need to send the load message to the target decision network element, and may directly serve as the target decision network element to execute the action executed by the target decision network element.

Step 203: The service sampling network element obtains reference traffic information. Specifically, the service sampling network element may obtain the reference traffic information of the target service. The reference traffic information is used to indicate a quantity of service requests of the target service that are responded to by the service sampling network element in any sampling cycle, or the reference traffic information is used to indicate an average quantity of service requests of the target service that are responded to by the service sampling network element in the any sampling cycle, or the reference traffic information is used to indicate a quantity of service requests of the target service that are responded to by the service sampling network element at an obtaining time of the reference traffic information. The target service may be a network protocol, and a request of the target service may be a request in the network protocol. For example, the network protocol may be the Transmission Control Protocol/Internet Protocol (TCP/IP) at an application layer, for example, at least one of the Hypertext Transfer Protocol (HTTP), the File Transfer Protocol (FTP), or the Post Office Protocol (POP).

Step 204: The service sampling network element sends a traffic message. Specifically, the service sampling network element may obtain an address of a target decision network element corresponding to the target service, and send the traffic message to the target decision network element according to the address of the target decision network element. The traffic message includes the reference traffic information. In this embodiment of the present invention, the service resource is a resource used to process the target service. Therefore, the target decision network element corresponding to the service resource is the same as the target decision network element corresponding to the target service.

When a forwarding gateway needs to be used for forwarding, an address of a forwarding gateway corresponding to the target decision network element may be determined according to the address of the target decision network element. The traffic message is sent to the forwarding gateway according to the address of the forwarding gateway, so that the forwarding gateway sends the traffic message to the target decision network element corresponding to the target service. The traffic message includes the address of the target decision network element.

When obtaining the address of the target decision network element corresponding to the target service, the service sampling network element may determine whether the address of the target decision network element corresponding to the target service is an address of the service sampling network element. When the address of the target decision network element corresponding to the target service is not the address of the service sampling network element, the service sampling network element may send the traffic message to the target decision network element according to the address of the target decision network element corresponding to the target service. When the address of the target decision network element corresponding to the target service is the address of the service sampling network element, it indicates that the target decision network element corresponding to the target service and the service sampling network element are a same network element. On a basis that the service sampling network element obtains the reference traffic information of the target service, the service sampling network element does not need to send the traffic message to the target decision network element, and may directly serve as the target decision network element to execute an action executed by the target decision network element.

Specifically, the traffic message may further include service traffic identifier information of the target service, and the service traffic identifier information is used to identify the target service. The service traffic identifier information may be preset. The service traffic identifier information may include at least one of a service type identifier of the target service, the address of the target decision network element, the address of the service sampling network element, duration of a sampling cycle of traffic information of the target service, a network layer protocol version of the target service, a transport layer protocol type of the target service, or a destination port number of a transport layer protocol of the target service.

The network layer protocol version of the target service may be an Internet Protocol version 4 (IPV4) or an Internet Protocol version 6 (IPV46). The transport layer protocol type of the target service may be the Transmission Control Protocol (TCP) or the User Datagram Protocol (UDP).

Correspondingly, the destination port number of the transport layer protocol of the target service may be a destination port number of the TCP or a destination port number of the UDP.

Duration between two adjacent times for obtaining the traffic information of the target service is the sampling cycle of the traffic information of the target service. The reference traffic information may indicate a total quantity of service requests of the target service that are responded to in a time period that is prior to the obtaining time of the reference traffic information and whose duration is the sampling cycle, or may indicate an average quantity of service requests of the target service that are responded to in a time period that is prior to the obtaining time of the reference traffic information and whose duration is the sampling cycle.

In a specific implementation process, the service type identifier may be used to identify at least one of the HTTP, the FTP, or the POP. Alternatively, the service type identifier may be a preset number. The number may be used to identify a protocol type, or may be used to identify at least one of a network layer protocol version, a transport layer protocol type, or a destination port number of a transport layer protocol. That is, when numbers are different, it indicates that at least one of the protocol type, the network layer protocol version, the transport layer protocol type, or the destination port number of the transport layer protocol is different. That is, when the service type identifier is the preset number, the service traffic identifier information may not include the network layer protocol version of the target service, the transport layer protocol type of the target service, and the destination port number of the transport layer protocol of the target service.

In a specific implementation process, when a value of the sampling cycle of the traffic information of the target service is a default preset value, the service traffic identifier information may not include the sampling cycle of the traffic information of the target service.

Specifically, the traffic message may further include obtaining time information of the reference traffic information, so that the target decision network element determines, according to the obtaining time information, whether the reference traffic information is repeated information. The obtaining time information of the reference traffic information may be a time, may be a sequence number of the reference traffic information, or may be a value of a counter configured to count the reference traffic information.

Specifically, the traffic message further includes priority information of the target service. The priority information may be preset.

It should be noted that, when the service sampling network element and the target decision network element corresponding to the target service are the same network element by default, on a basis that the service sampling network element obtains the reference traffic information, the service sampling network element may not need to send the traffic message to the target decision network element corresponding to the target service, and may directly serve as the target decision network element corresponding to the target service to execute the action executed by the target decision network element corresponding to the target service.

Step 205: The decision network element determines target traffic control information. In step 205, it is assumed that the decision network element is the target decision network element corresponding to the target service and the target decision network element corresponding to the service resource.

Before determining the reference traffic information, the decision network element may obtain the reference load information of the service resource used to process the target service, and the reference load information is used to indicate the usage status of the service resource. The decision network element determines the target traffic control information of the target service according to the reference load information, and the target traffic control information is used to indicate a processing policy of a service request of the target service. When the decision network element and the resource sampling network element are not a same network element, a specific manner of obtaining the reference load information may be as follows: The load message that is from the resource sampling network element and that includes the reference load information is received, and the reference traffic information is extracted from the traffic message that is from the service sampling network element.

In a specific implementation process, the target traffic control information includes at least one of a ratio of a quantity of requests of the target service that need to be discarded to a quantity of requests of the target service that need to be processed, or an upper limit of a quantity of requests of the target service that need to be responded to.

When the target traffic control information includes the upper limit of the quantity of requests of the target service that are allowed to be processed and that need to be responded to, the decision network element may obtain the reference traffic information of the target service. The reference traffic information is used to indicate the quantity of service requests of the target service that are responded to by the service sampling network element in the any sampling cycle, or the reference traffic information is used to indicate the average quantity of service requests of the target service that are responded to by the service sampling network element in the any sampling cycle, or the reference traffic information is used to indicate the quantity of service requests of the target service that are responded to by the service sampling network element at the obtaining time of the reference traffic information. The decision network element determines whether the reference load information meets a traffic control condition, and when the reference load information meets the traffic control condition, the decision network element uses, as the upper limit, a product of a control coefficient and the quantity that is of service requests of the target service and that is indicated by the reference traffic information. The control coefficient is a real number greater than or equal to 0 and less than 1. When the decision network element and the service sampling network element are not a same network element, a specific manner of obtaining the reference traffic information may be as follows: The traffic message that is from the service sampling network element and that includes the reference traffic information is received, and the reference traffic information is extracted from the traffic message that is from the service sampling network element.

In a specific implementation process, the decision network element may obtain the priority information of the target service; determine, according to the priority information and a preset correspondence, the control coefficient corresponding to the priority information; and use, as the upper limit, the product of the control coefficient corresponding to the priority information and the quantity that is indicated by the reference traffic information and that is of service requests of the target service that are responded to.

An implementation of obtaining the priority information of the target service may be as follows: The decision network element may be the service sampling network element in the first aspect, so as to obtain the priority information. Alternatively, an implementation of obtaining the priority information of the target service may be as follows: The traffic message from the service sampling network element is received, and the traffic message includes the priority information.

When the reference traffic information indicates the quantity of service requests of the target service that are responded to by the service sampling network element in the any sampling cycle, the correspondence between the control coefficient and the priority information may be as follows:

When the priority information indicates that a priority is a level I, the control coefficient is 80%; when the priority information indicates that a priority is a level II, the control coefficient is 50%; or when the priority information indicates that a priority is a level III, the control coefficient is 0.

When the reference load information does not meet the traffic control condition, the target traffic control information is used to instruct not to perform traffic control on the target service. In a specific implementation, the target traffic control information may be the upper limit of the quantity of requests of the target service that are allowed to be processed and that need to be responded to. A value of the upper limit indicates a maximum value that can be indicated by the upper limit. For example, when the upper limit is indicated by N hexadecimal digits, the upper limit may be N Fs, and N is a positive integer.

When the target traffic control information includes the ratio of the quantity of requests of the target service that need to be discarded to the quantity of requests of the target service that need to be processed, the decision network element may determine, according to the reference load information, whether the reference load information meets a traffic control condition; and when the reference load information meets the traffic control condition, determine the target traffic control information. The target traffic control information is used to indicate the preset ratio.

In a specific implementation process, the decision network element may determine, according to the obtained priority information and a preset correspondence, the ratio corresponding to the priority information.

The correspondence between the ratio and the priority information may be as follows:

When the priority information indicates that a priority is a level I, the ratio is 20%; when the priority information indicates that a priority is a level II, the ratio is 50%; or when the priority information indicates that a priority is a level III, the ratio is 100%.

In a specific implementation process, the priority information may further indicate that a priority is a level 0. Therefore, that the target traffic control information of the target service is determined according to the reference load information may be as follows: It is determined, according to the reference load information, whether the reference load information meets a traffic control condition; when the reference load information meets the traffic control condition, the priority information of the target service is obtained; and when the priority information indicates that the priority is the level 0, it is determined that the target traffic control information is used to instruct not to perform traffic control on the target service.

When the traffic message further includes the address of the target decision network element corresponding to the target service, the decision network element may determine whether the address of the target decision network element corresponding to the target service is the same as an address of the decision network element. In this step, it is assumed that the decision network element is the target decision network element. However, when the address of the target decision network element corresponding to the target service is different from the address of the decision network element, the decision network element may forward the traffic message to the target decision network element according to the address of the target decision network element. Only when the address of the target decision network element corresponding to the target service is the same as the address of the decision network element, the product of the control coefficient and the quantity that is indicated by the reference traffic information and that is of service requests of the target service that are responded to is used as the upper limit.

When the traffic message further includes the obtaining time information of the reference traffic information, the decision network element may determine whether the time indicated by the obtaining time information of the reference traffic information is later than a time indicated by obtaining time information of previous traffic information. The previous traffic information is traffic information received before the reference traffic information is received. Only when the time indicated by the obtaining time information of the reference traffic information is later than the time indicated by the obtaining time information of the previous traffic information, the product of the control coefficient and the quantity that is indicated by the reference traffic information and that is of service requests of the target service that are responded to is used as the upper limit. The traffic message may be discarded when the obtaining time information of the reference traffic information is the same as the obtaining time information of the previous traffic information, or when the time indicated by the obtaining time information of the reference traffic information is earlier than the time indicated by the obtaining time information of the previous traffic information.

When the load message further includes the address of the target decision network element corresponding to the service resource, the decision network element may determine whether the address of the target decision network element corresponding to the service resource is the same as the address of the decision network element. Only when the address of the target decision network element corresponding to the service resource is the same as the address of the decision network element, the target traffic control information of the target service is determined according to the reference load information. In this step, it is assumed that the decision network element is the target decision network element. However, when the address of the target decision network element corresponding to the service resource is different from the address of the decision network element, the decision network element may forward the load message to the target decision network element according to the address of the target decision network element.

When the load message further includes the obtaining time information of the reference load information, the decision network element may determine whether the time indicated by the obtaining time information of the reference load information is later than a time indicated by obtaining time information of previous load information. The previous load information is load information received before the reference load information is received. Only when the time indicated by the obtaining time information of the reference load information is later than the time indicated by the obtaining time information of the previous load information, the target traffic control information of the target service is determined according to the reference load information. The decision network element may discard the load message when the obtaining time information of the reference load information is the same as the obtaining time information of the previous load information, or when the time indicated by the obtaining time information of the reference load information is earlier than the time indicated by the obtaining time information of the previous load information.

Step 206: The decision network element sends a traffic control message. The decision network element may obtain a preset address of a target execution network element corresponding to the target service, and send the traffic control message to the target execution network element according to the address of the target execution network element. The traffic control message includes the target traffic control information.

When a forwarding gateway needs to be used for forwarding, an address of a forwarding gateway corresponding to the target execution network element may be determined according to the address of the target execution network element. The traffic control message is sent to the forwarding gateway according to the address of the forwarding gateway, so that the forwarding gateway forwards the traffic control message to the target execution network element. The target traffic control message may include the address of the target execution network element.

The decision network element may have a function of a forwarding gateway, or the decision network element may be a forwarding gateway. In a cross-subnet traffic control solution, the decision network element does not need to send the traffic control message to a forwarding gateway, and may directly serve as a forwarding gateway to send the traffic control message to the designated network element.

When obtaining the address of the target execution network element corresponding to the target service, the decision network element may determine whether the address of the target execution network element is the address of the decision network element. When the address of the target execution network element is not the address of the decision network element, the decision network element may send the traffic control message to the target execution network element according to the address of the target execution network element. When the address of the target execution network element is the address of the decision network element, it indicates that the decision network element and the target execution network element are a same network element. The decision network element does not need to send the traffic control message to the target execution network element, and on a basis that the decision network element obtains the target traffic control information, the decision network element may serve as the target execution network element to execute, for the target service according to the target traffic control information, the processing policy that is of the service request of the target service and that is indicated by the target traffic control information.

The traffic control message may further include service control identifier information of the target service, and the service control identifier information is used to identify the target service. The service control identifier information may be preset, and the service control identifier information may be different from the service traffic identifier information in the traffic message. The service control identifier information may include at least one of the service type identifier of the target service, the address of the decision network element, the address of the target execution network element, duration of a control cycle of traffic control information of the target service, the network layer protocol version of the target service, the transport layer protocol type of the target service, or the destination port number of the transport layer protocol of the target service.

Duration between two adjacent times for determining the traffic control information of the target service is the control cycle of the traffic control information of the target service. The target traffic control information may indicate a processing policy of a service request of the target service in a time period that is after a determining time of the target traffic control information and whose duration is the control cycle (or a next control cycle of a current cycle).

In a specific implementation process, when a value of the control cycle of the traffic control information of the target service is a default preset value, the service control identifier information may not include the control cycle of the traffic control information of the target service.

Specifically, the traffic control message may further include determining time information of the target traffic control information, so that the target execution network element determines, according to the determining time information, whether the target traffic control information is repeated information. The determining time information of the target traffic control information may be a time, may be a sequence number of the target traffic control information, or may be a value of a counter configured to count the target traffic control information.

It should be noted that, when the target execution network element and the decision network element are the same network element by default, the decision network element does not need to send the traffic control message to the target execution network element, and on a basis that the decision network element obtains the target traffic control information, the decision network element may serve as the target execution network element to execute, for the target service according to the target traffic control information, the processing policy that is of the service request of the target service and that is indicated by the target traffic control information.

Step 207: The execution network element executes a processing policy. In step 207, it is assumed that the execution network element is the target execution network element corresponding to the target service. When the decision network element and the execution network element are not a same network element, the execution network element may receive the traffic control message of the target service from the decision network element. The traffic control message includes the target traffic control information, and the target traffic control information is used to indicate the processing policy of the service request of the target service. The execution network element executes, for the target service according to the target traffic control information, the processing policy that is of the service request of the target service and that is indicated by the target traffic control information.

When the traffic control message further includes the determining time information of the target traffic control information, the execution network element may determine whether the time indicated by the determining time information of the target traffic control information is later than a time indicated by determining time information of previous traffic control information. The previous traffic control information is traffic control information received before the target traffic control information is received. Only when the time indicated by the determining time information of the target traffic control information is later than the time indicated by the determining time information of the previous traffic control information, the processing policy that is of the service request of the target service and that is indicated by the target traffic control information is executed for the target service according to the target traffic control information. The execution network element may discard the traffic control message when the determining time information of the target traffic control information is the same as the determining time information of the previous traffic control information, or when the time indicated by the determining time information of the target traffic control information is earlier than the time indicated by the determining time information of the previous traffic control information.

When the traffic control message further includes the address of the target execution network element corresponding to the target service, the execution network element may determine whether the address of the target execution network element corresponding to the target service is the same as an address of the execution network element. In this step, it is assumed that the execution network element is the target execution network element. However, when the address of the target execution network element corresponding to the target service is different from the address of the execution network element, the traffic control message is forwarded to the target execution network element according to the address of the target execution network element. Only when the address of the target execution network element corresponding to the target service is the same as the address of the execution network element, the processing policy that is of the service request of the target service and that is indicated by the target traffic control information is executed for the target service according to the target traffic control information.

When the target traffic control information includes the ratio of the quantity of requests of the target service that need to be discarded to the quantity of requests of the target service that need to be processed, the execution network element may discard received requests according to the ratio. When the ratio is M %, the execution network element may first respond to k*(100−M) requests, and then discard k*M requests. M is a non-negative integer less than or equal to 100, and k is a positive number. For another example, when neither k*(100−M) nor k*M is a positive number, rounding operations may be performed on k*(100−M) and k*M. When the ratio is 20%, the execution network element may first respond to four requests, and then discard one request; or the execution network element may first respond to 80 requests, and then discard 20 requests. It should be noted that whether a request is first responded to or first discarded is not limited in this embodiment of the present invention.

When the target traffic control information includes the upper limit of the quantity of requests of the target service that are allowed to be processed and that need to be responded to, the execution network element may no longer respond to a request of the target service when a quantity of requests that are responded to in a current control cycle reaches the upper limit.

Figure 3:
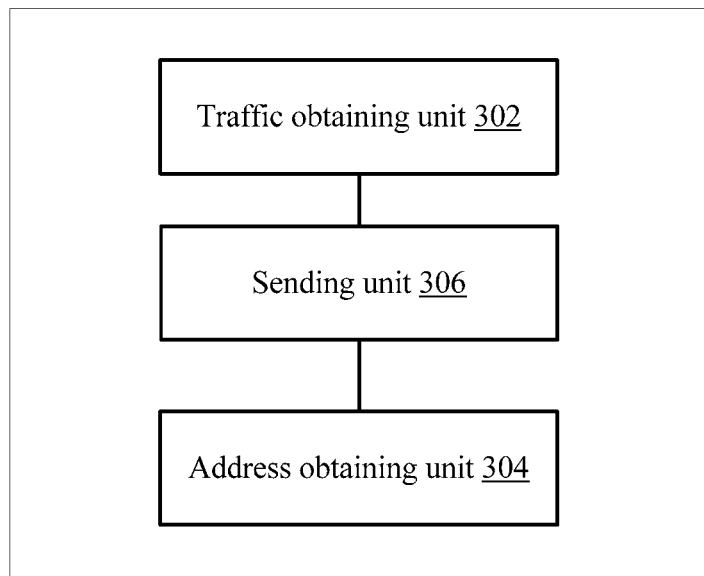
FIG. 3 is a schematic diagram of a logical structure of a service sampling network element according to an embodiment of the present invention.

FIG. 3 is a schematic diagram of a logical structure of a service sampling network element according to an embodiment of the present invention. As shown in FIG. 3, the service sampling network element 300 includes a traffic obtaining unit 302, an address obtaining unit 304, and a sending unit 306.

The traffic obtaining unit 302 is configured to obtain reference traffic information of a target service. The reference traffic information is used to indicate a quantity of service requests of the target service that are responded to by the service sampling network element in any sampling cycle, or the reference traffic information is used to indicate an average quantity of service requests of the target service that are responded to by the service sampling network element in the any sampling cycle, or the reference traffic information is used to indicate a quantity of service requests of the target service that are responded to by the service sampling network element at an obtaining time of the reference traffic information.

The address obtaining unit 304 is configured to obtain an address of a target decision network element corresponding to the target service.

The sending unit 306 is configured to send a traffic message to the target decision network element according to the address of the target decision network element that is obtained by the address obtaining network element 304. The traffic message includes the reference traffic information obtained by the traffic obtaining unit 302.

The traffic message may further include service traffic identifier information of the target service, and the service traffic identifier information is used to identify the target service. The service traffic identifier information may include at least one of a service type identifier of the target service, the address of the target decision network element, an address of the service sampling network element, duration of a sampling cycle of traffic information of the target service, a network layer protocol version of the target service, a transport layer protocol type of the target service, or a destination port number of a transport layer protocol of the target service.

The traffic message may further include obtaining time information of the reference traffic information, so that the target decision network element determines, according to the obtaining time information, whether the reference traffic information is repeated information.

The traffic message may further include priority information of the target service.

The sending unit 306 may be configured to: determine, according to the address of the target decision network element, an address of a forwarding gateway corresponding to the target decision network element; and send the traffic message to the forwarding gateway according to the address of the forwarding gateway, so that the forwarding gateway forwards the traffic message to the target decision network element. The traffic message includes the address of the target decision network element.

Before sending the traffic message to the target decision network element according to the address of the target decision network element, the sending unit 306 may be further configured to: determine whether the address of the target decision network element is the address of the service sampling network element; and only when the address of the target decision network element is not the address of the service sampling network element, send the traffic message to the target decision network element according to the address of the target decision network element.

It may be understood that for a specific implementation process of each unit in the service sampling network element 300 in this embodiment, reference may be made to the method executed by the service sampling network element in the foregoing method embodiment. Details are not described herein again.

Figure 4:
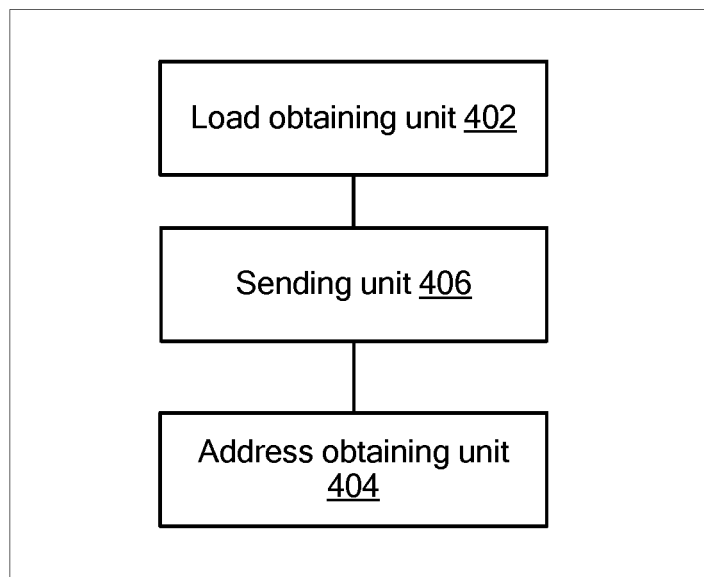
FIG. 4 is a schematic diagram of a logical structure of a resource sampling network element according to an embodiment of the present invention.

FIG. 4 is a schematic diagram of a logical structure of a resource sampling network element according to an embodiment of the present invention. As shown in FIG. 4, the resource sampling network element 400 includes a load obtaining unit 402, an address obtaining unit 404, and a sending unit 406. It should be noted that, when the service sampling network element 300 and the resource sampling network element 400 are a same network element, the address obtaining unit 304 and the address obtaining unit 404 may be a same unit, and the sending unit 306 and the sending unit 406 may be a same unit.

The load obtaining unit 402 is configured to obtain reference load information of a service resource that is of the resource sampling network element and that is used to process a target service. The reference load information is used to indicate a usage status of the service resource.

The address obtaining unit 404 is configured to obtain an address of a target decision network element corresponding to the service resource.

The sending unit 406 is configured to send a load message to the target decision network element according to the address of the target decision network element that is obtained by the address obtaining unit 404. The load message includes the reference load information obtained by the load obtaining unit 402 and preset resource identifier information of the service resource, and the resource identifier information is used to identify the service resource.

The resource identifier information may include at least one of a resource type identifier of the service resource, the address of the target decision network element, an address of the resource sampling network element, or duration of a sampling cycle of load information of the service resource.

The load message may further include obtaining time information of the reference load information, so that the target decision network element determines, according to the obtaining time information, whether the reference load information is repeated information.

The sending unit 406 may be configured to: determine, according to the address of the target decision network element, an address of a forwarding gateway corresponding to the target decision network element; and send the load message to the forwarding gateway according to the address of the forwarding gateway, so that the forwarding gateway forwards the load message to the target decision network element. The load message includes the address of the target decision network element.

Before sending the load message to the target decision network element according to the address of the target decision network element, the sending unit 406 may be further configured to: determine whether the address of the target decision network element is the address of the resource sampling network element; and only when the address of the target decision network element is not the address of the resource sampling network element, send the load message to the target decision network element according to the address of the target decision network element.

It may be understood that for a specific implementation process of each unit in the resource sampling network element 400 in this embodiment, reference may be made to the method executed by the resource sampling network element in the foregoing method embodiment. Details are not described herein again.

Figure 5:
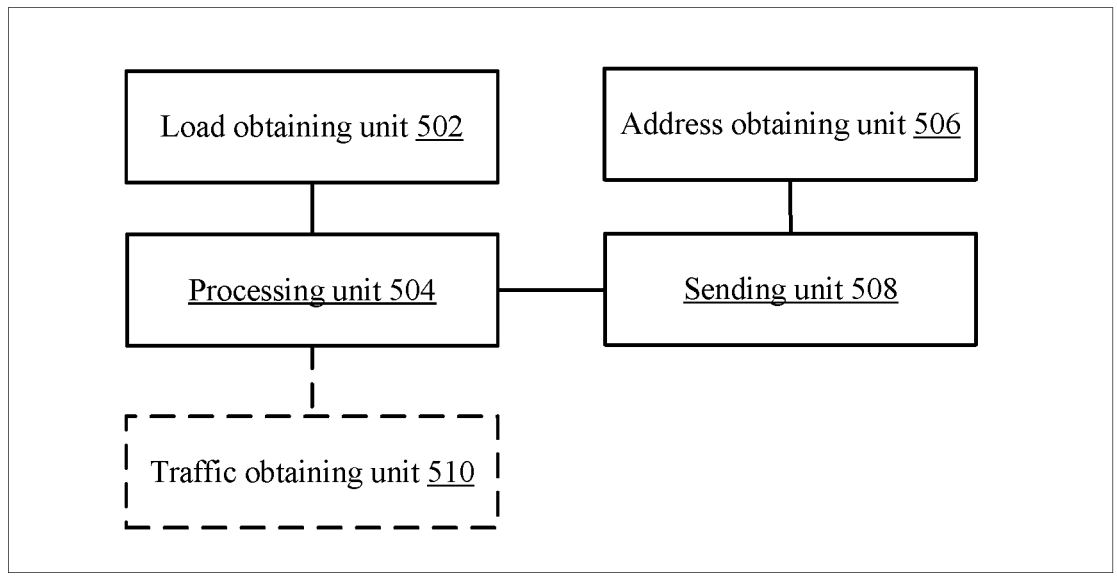
FIG. 5 is a schematic diagram of a logical structure of a decision network element according to an embodiment of the present invention.

FIG. 5 is a schematic diagram of a logical structure of a decision network element according to an embodiment of the present invention. As shown in FIG. 5, the decision network element 500 includes a load obtaining unit 502, a processing unit 504, an address obtaining unit 506, and a sending unit 508. It should be noted that, when the service sampling network element 300 and the decision network element 500 are a same network element, the address obtaining unit 304 and the address obtaining unit 506 may be a same unit, and the service sampling network element may not have the sending unit 306. When the resource sampling network element 400 and the decision network element 500 are a same network element, the load obtaining unit 402 and the load obtaining unit 502 may be a same unit, the address obtaining unit 404 and the address obtaining unit 506 may be a same unit, and the resource sampling network element may not have the sending unit 406.

The load obtaining unit 502 is configured to obtain reference load information of a service resource used to process a target service. The reference load information is used to indicate a usage status of the service resource.

The load obtaining unit 502 may be configured to extract the reference load information from a load message that is from the resource sampling network element.

The processing unit 504 is configured to determine target traffic control information of the target service according to the reference load information obtained by the load obtaining unit 502. The target traffic control information is used to indicate a processing policy of a service request of the target service.

The target traffic control information includes at least one of a ratio of a quantity of service requests of the target service that need to be discarded in a next control cycle of a current control cycle to a quantity of service requests of the target service that need to be processed in the next control cycle of the current control cycle, or an upper limit of a quantity of service requests of the target service that need to be responded to in the next control cycle.

When the target traffic control information includes the upper limit of the quantity of requests of the target service that need to be responded to, the decision network element 500 may further include a traffic obtaining unit 510. The traffic obtaining unit 510 may be configured to obtain reference traffic information of the target service. The reference traffic information is used to indicate a quantity of service requests of the target service that are responded to by the service sampling network element in any sampling cycle, or the reference traffic information is used to indicate an average quantity of service requests of the target service that are responded to by the service sampling network element in the any sampling cycle, or the reference traffic information is used to indicate a quantity of service requests of the target service that are responded to by the service sampling network element at an obtaining time of the reference traffic information. Correspondingly, the processing unit 504 may be configured to: determine whether the reference load information meets a traffic control condition; and when the reference load information meets the traffic control condition, use, as the upper limit, a product of a control coefficient and the quantity that is of service requests of the target service and that is indicated by the reference traffic information. The control coefficient is a real number greater than or equal to 0 and less than 1. It should be noted that, when the service sampling network element and the decision network element are the same network element, the traffic obtaining unit 302 and the traffic obtaining unit 510 may be a same unit.

The traffic obtaining unit 510 may be configured to extract the reference traffic information from a traffic message that is from the service sampling network element.

The traffic message may further include an address of a target decision network element corresponding to the target service. Only when the address of the target decision network element corresponding to the target service is the same as an address of the decision network element, the processing unit 504 is configured to use, as the upper limit, the product of the control coefficient and the quantity that is indicated by the reference traffic information and that is of service requests of the target service that are responded to.

The traffic message may further include obtaining time information of the reference traffic information. A time indicated by the obtaining time information is the obtaining time of the reference traffic information. Only when the obtaining time of the reference traffic information is later than an obtaining time of previous traffic information, the processing unit 504 is configured to use, as the upper limit, the product of the control coefficient and the quantity that is of service requests of the target service and that is indicated by the reference traffic information. The previous traffic information is traffic information received before the reference traffic information is received.

The load message may further include an address of a target decision network element corresponding to the service resource. Only when the address of the target decision network element corresponding to the service resource is the same as the address of the decision network element, the processing unit 504 is configured to determine the target traffic control information of the target service according to the reference load information.

The load message may further include obtaining time information of the reference load information. Only when a time indicated by the obtaining time information of the reference load information is later than a time indicated by obtaining time information of previous load information, the processing unit 504 is configured to determine the target traffic control information of the target service according to the reference load information. The previous load information is load information received before the reference load information is received.

The address obtaining unit 506 is configured to obtain an address of a target execution network element corresponding to the target service.

The sending unit 508 is configured to send a traffic control message to the target execution network element according to the address of the target execution network element that is obtained by the obtaining unit 506. The traffic control message includes the target traffic control information determined by the processing unit 504.

The traffic control message may further include service control identifier information of the target service, and the service control identifier information is used to identify the target service. The service control identifier information may include at least one of a service type identifier of the target service, the address of the decision network element, the address of the target execution network element, duration of a control cycle of traffic control information of the target service, a network layer protocol version of the target service, a transport layer protocol type of the target service, or a destination port number of a transport layer protocol of the target service.

The traffic control message may further include determining time information of the target traffic control information, so that the target execution network element determines, according to the determining time information, whether the target traffic control information is repeated information.

The sending unit 508 may be configured to: determine, according to the address of the target execution network element, an address of a forwarding gateway corresponding to the target execution network element; and send the traffic control message to the forwarding gateway according to the address of the forwarding gateway, so that the forwarding gateway forwards the traffic control message to the target execution network element. The target traffic control message includes the address of the target execution network element.

Before sending the traffic control message to the target execution network element according to the address of the target execution network element, the sending unit 508 may be further configured to: determine whether the address of the target execution network element is the address of the decision network element; and only when the address of the target execution network element is not the address of the decision network element, send the traffic control message to the target execution network element according to the address of the target execution network element.

It may be understood that for a specific implementation process of each unit in the decision network element 500 in this embodiment, reference may be made to the method executed by the decision network element in the foregoing method embodiment. Details are not described herein again.

Figure 6:
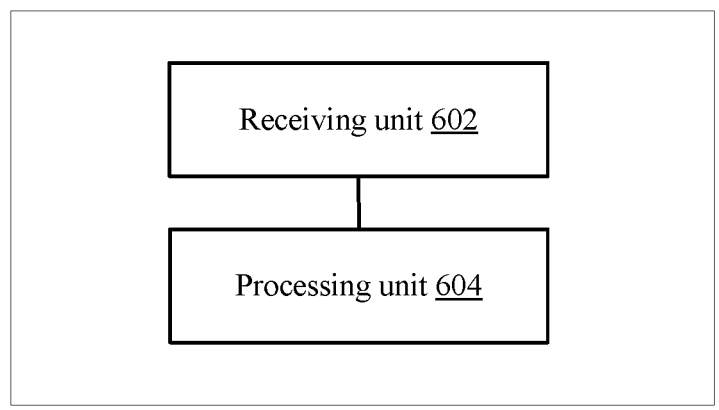
FIG. 6 is a schematic diagram of a logical structure of an execution network element according to an embodiment of the present invention.

FIG. 6 is a schematic diagram of a logical structure of an execution network element according to an embodiment of the present invention. As shown in FIG. 6, the execution network element 600 includes a receiving unit 602 and a processing unit 604. It should be noted that, when the decision network element 500 and the execution network element 600 are a same network element, the execution network element 600 may not have the receiving unit, and the processing unit 504 and the processing unit 604 may be a same unit.

The receiving unit 602 is configured to receive a traffic control message of a target service from a decision network element. The traffic control message includes target traffic control information, and the target traffic control information is used to indicate a processing policy of a service request of the target service.

The processing unit 604 is configured to execute, for the target service according to the target traffic control information received by the receiving unit 602, the processing policy that is of the service request of the target service and that is indicated by the target traffic control information.

The traffic control message may further include determining time information of the target traffic control information. Only when a time indicated by the determining time information of the target traffic control information is later than a time indicated by determining time information of previous traffic control information, the processing unit 604 is configured to execute, for the target service according to the target traffic control information, the processing policy that is of the service request of the target service and that is indicated by the target traffic control information. The previous traffic control information is traffic control information received before the target traffic control information is received.

The traffic control message may further include an address of a target execution network element corresponding to the target service. Only when the address of the target execution network element corresponding to the target service is the same as an address of the execution network element, the processing unit 604 is configured to execute, for the target service according to the target traffic control information, the processing policy that is of the service request of the target service and that is indicated by the target traffic control information.

It may be understood that for a specific implementation process of each unit in the execution network element 600 in this embodiment, reference may be made to the method executed by the execution network element in the foregoing method embodiment. Details are not described herein again.

Figure 7:
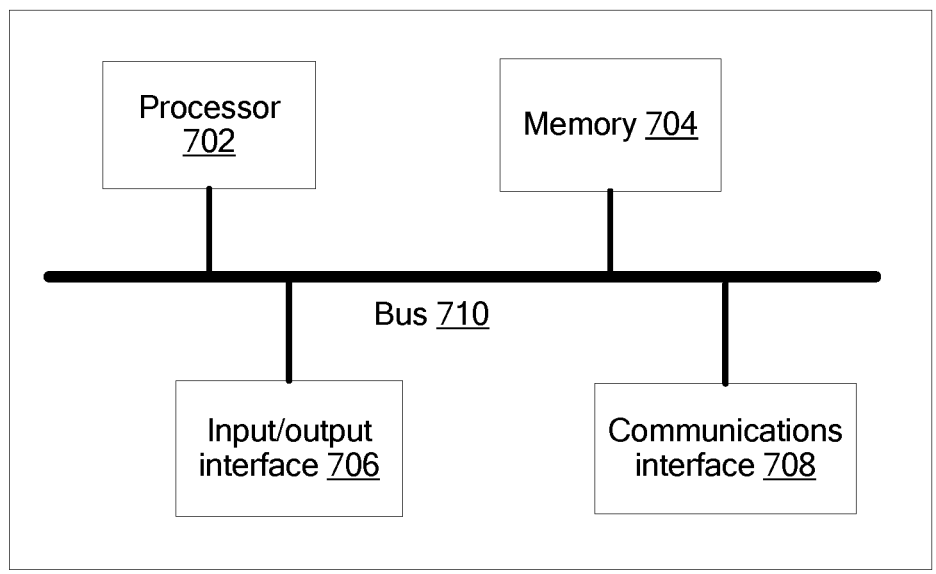
FIG. 7 is a schematic diagram of a hardware structure of a service sampling network element according to an embodiment of the present invention.

FIG. 7 is a schematic diagram of a hardware structure of a service sampling network element according to an embodiment of the present invention. As shown in FIG. 7, the service sampling network element 700 may be used as an implementation of the service sampling network element 300. The service sampling network element 700 includes a processor 702, a memory 704, an input/output interface 706, a communications interface 708, and a bus 710. The processor 702, the memory 704, the input/output interface 706, and the communications interface 708 implement communication and connection between each other by using the bus 710.

It should be understood that the service sampling network element 700 may be specifically a computer device.

By using a general-purpose central processing unit (CPU), a microprocessor, an application-specific integrated circuit (ASIC), or one or more integrated circuits, the processor 702 may be configured to: execute a related program, so as to implement the actions of the traffic obtaining unit 302, the address obtaining unit 304, and the sending unit 306 that are included in the service sampling network element 300 provided in the embodiment of the present invention; or execute the method that needs to be executed by the service sampling network element provided in the method embodiment of the present invention. The processor 702 may be an integrated circuit chip, and has a signal processing capability. In an implementation process, the traffic obtaining unit 302, the address obtaining unit 304, and the sending unit 306 may be implemented by using an integrated logic circuit of hardware in the processor 702 or an instruction in a form of software. The processor 702 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any normal processor, or the like.

The memory 704 may be a read-only memory (ROM), a static storage device, a dynamic storage device, or a random access memory (RAM). The memory 704 may store data and code of the related program used to implement the traffic obtaining unit 302, the address obtaining unit 304, and the sending unit 306 that are included in the service sampling network element 300 provided in the embodiment of the present invention or to execute the method that needs to be executed by the service sampling network element provided in the method embodiment of the present invention.

The input/output interface 706 is configured to: receive input data and information, and output data such as an operation result.

A transceiver apparatus that includes but is not limited to a transceiver is used as the communications interface 708. The communications interface 708 obtains a sending instruction of the processor 702, so as to implement the sending action of the sending unit 306 in the service sampling network element 300, and execute the sending action executed by the service sampling network element in the method embodiment of the present invention.

The bus 710 may include a path for transmitting information between components (for example, the processor 702, the memory 704, the input/output interface 706, and the communications interface 708) in the service sampling network element 700.

It should be noted that only the processor 702, the memory 704, the input/output interface 706, the communications interface 708, and the bus 710 are shown for the service sampling network element 700 in FIG. 7. However, in a specific implementation process, a person skilled in the art should understand that the service sampling network element 700 further includes other components essential for normal running. In addition, a person skilled in the art should understand that according to a specific requirement, the service sampling network element 700 may further include hardware components for implementing other additional functions. In addition, a person skilled in the art should understand that the service sampling network element 700 may include only components essential for implementing this embodiment of the present invention, but not necessarily include all the components shown in FIG. 7.

Figure 8:
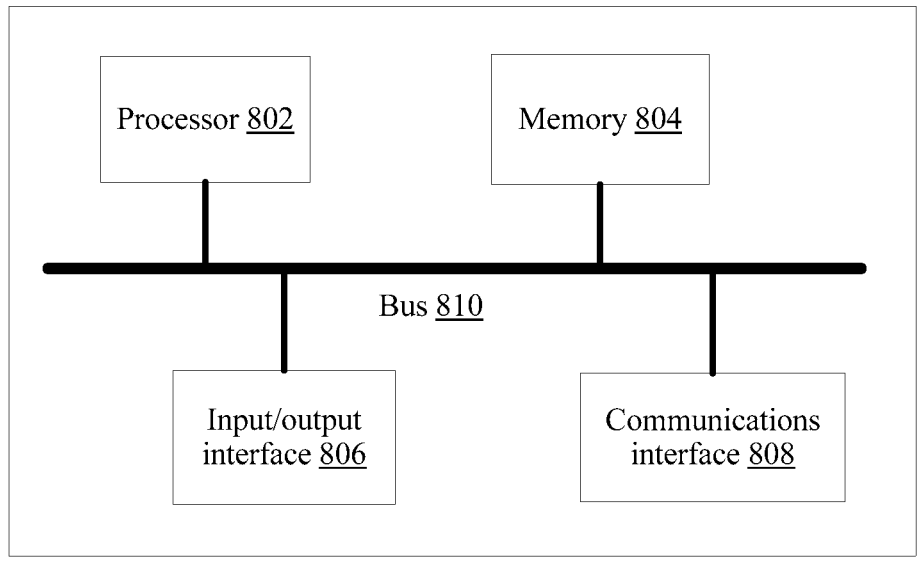
FIG. 8 is a schematic diagram of a hardware structure of a resource sampling network element according to an embodiment of the present invention.

FIG. 8 is a schematic diagram of a hardware structure of a resource sampling network element according to an embodiment of the present invention. As shown in FIG. 8, the resource sampling network element 800 may be used as an implementation of the resource sampling network element 400. The resource sampling network element 800 includes a processor 802, a memory 804, an input/output interface 806, a communications interface 808, and a bus 810. The processor 802, the memory 804, the input/output interface 806, and the communications interface 808 implement communication and connection between each other by using the bus 810.

It should be understood that the resource sampling network element 800 may be specifically a computer device.

By using a general-purpose central processing unit (CPU), a microprocessor, an application-specific integrated circuit (ASIC), or one or more integrated circuits, the processor 802 may be configured to: execute a related program, so as to implement the actions of the load obtaining unit 402, the address obtaining unit 404, and the sending unit 406 that are included in the resource sampling network element 400 provided in the embodiment of the present invention; or execute the method that needs to be executed by the resource sampling network element provided in the method embodiment of the present invention. The processor 802 may be an integrated circuit chip, and has a signal processing capability. In an implementation process, the load obtaining unit 402, the address obtaining unit 404, and the sending unit 406 may be implemented by using an integrated logic circuit of hardware in the processor 802 or an instruction in a form of software. The processor 802 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any normal processor, or the like.

The memory 804 may be a read-only memory (ROM), a static storage device, a dynamic storage device, or a random access memory (RAM). The memory 804 may store data and code of the related program used to implement the load obtaining unit 402, the address obtaining unit 404, and the sending unit 406 that are included in the resource sampling network element 400 provided in the embodiment of the present invention or to execute the method that needs to be executed by the resource sampling network element provided in the method embodiment of the present invention.

The input/output interface 806 is configured to: receive input data and information, and output data such as an operation result.

A transceiver apparatus that includes but is not limited to a transceiver is used as the communications interface 808. The communications interface 808 obtains a sending instruction of the processor 802, so as to implement the sending action of the sending unit 406 in the resource sampling network element 400, and execute the sending action executed by the resource sampling network element in the method embodiment of the present invention.

The bus 810 may include a path for transmitting information between components (for example, the processor 802, the memory 804, the input/output interface 806, and the communications interface 808) in the resource sampling network element 800.

It should be noted that only the processor 802, the memory 804, the input/output interface 806, the communications interface 808, and the bus 810 are shown for the resource sampling network element 800 in FIG. 8. However, in a specific implementation process, a person skilled in the art should understand that the resource sampling network element 800 further includes other components essential for normal running. In addition, a person skilled in the art should understand that according to a specific requirement, the resource sampling network element 800 may further include hardware components for implementing other additional functions. In addition, a person skilled in the art should understand that the resource sampling network element 800 may include only components essential for implementing this embodiment of the present invention, but not necessarily include all the components shown in FIG. 8.

Figure 9:
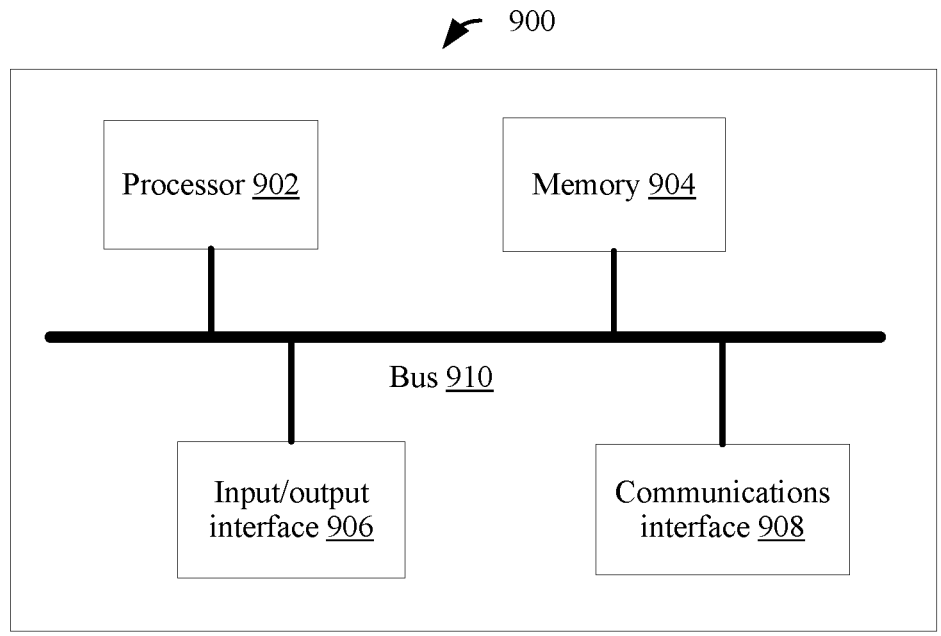
FIG. 9 is a schematic diagram of a hardware structure of a decision network element according to an embodiment of the present invention.

FIG. 9 is a schematic diagram of a hardware structure of a decision network element according to an embodiment of the present invention. As shown in FIG. 9, the decision network element 900 may be used as an implementation of the decision network element 500. The decision network element 900 includes a processor 902, a memory 904, an input/output interface 906, a communications interface 908, and a bus 910. The processor 902, the memory 904, the input/output interface 906, and the communications interface 908 implement communication and connection between each other by using the bus 910.

It should be understood that the decision network element 900 may be specifically a computer device.

By using a general-purpose central processing unit (CPU), a microprocessor, an application-specific integrated circuit (ASIC), or one or more integrated circuits, the processor 902 may be configured to: execute a related program, so as to implement the actions of the processing unit 504, the address obtaining unit 506, and the sending unit 508 that are included in the decision network element 500 provided in the embodiment of the present invention, and to implement the actions of the load obtaining unit 502 and the traffic obtaining unit 510 except the receiving action; or execute the method that needs to be executed by the decision network element provided in the method embodiment of the present invention. The processor 902 may be an integrated circuit chip, and has a signal processing capability. In an implementation process, the load obtaining unit 502, the processing unit 504, the address obtaining unit 506, the traffic obtaining unit 510, and the sending unit 508 may be implemented by using an integrated logic circuit of hardware in the processor 902 or an instruction in a form of software. The processor 902 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any normal processor, or the like.

The memory 904 may be a read-only memory (ROM), a static storage device, a dynamic storage device, or a random access memory (RAM). The memory 904 may store data and code of the related program used to implement the actions of the load obtaining unit 502, the processing unit 504, the address obtaining unit 506, the traffic obtaining unit 510, and the sending unit 508 that are included in the decision network element 500 provided in the embodiment of the present invention or to execute the method that needs to be executed by the decision network element provided in the method embodiment of the present invention.

The input/output interface 906 is configured to: receive input data and information, and output data such as an operation result.

A transceiver apparatus that includes but is not limited to a transceiver is used as the communications interface 908. The communications interface 908 obtains a sending instruction of the processor 902, so as to implement the sending action of the sending unit 508 in the decision network element 500, and execute the sending action executed by the service sampling network element in the method embodiment of the present invention. The load obtaining unit 502 and the traffic obtaining unit 510 may be the communications interface 908, so as to implement the actions of the load obtaining unit 502 and the traffic obtaining unit 510. The communications interface 908 may execute the receiving action executed by the decision network element in the method embodiment of the present invention.

The bus 910 may include a path for transmitting information between components (for example, the processor 902, the memory 904, the input/output interface 906, and the communications interface 908) in the decision network element 900.

It should be noted that only the processor 902, the memory 904, the input/output interface 906, the communications interface 908, and the bus 910 are shown for the decision network element 900 in FIG. 9. However, in a specific implementation process, a person skilled in the art should understand that the decision network element 900 further includes other components essential for normal running. In addition, a person skilled in the art should understand that according to a specific requirement, the decision network element 900 may further include hardware components for implementing other additional functions. In addition, a person skilled in the art should understand that the decision network element 900 may include only components essential for implementing this embodiment of the present invention, but not necessarily include all the components shown in FIG. 9.

Figure 10:
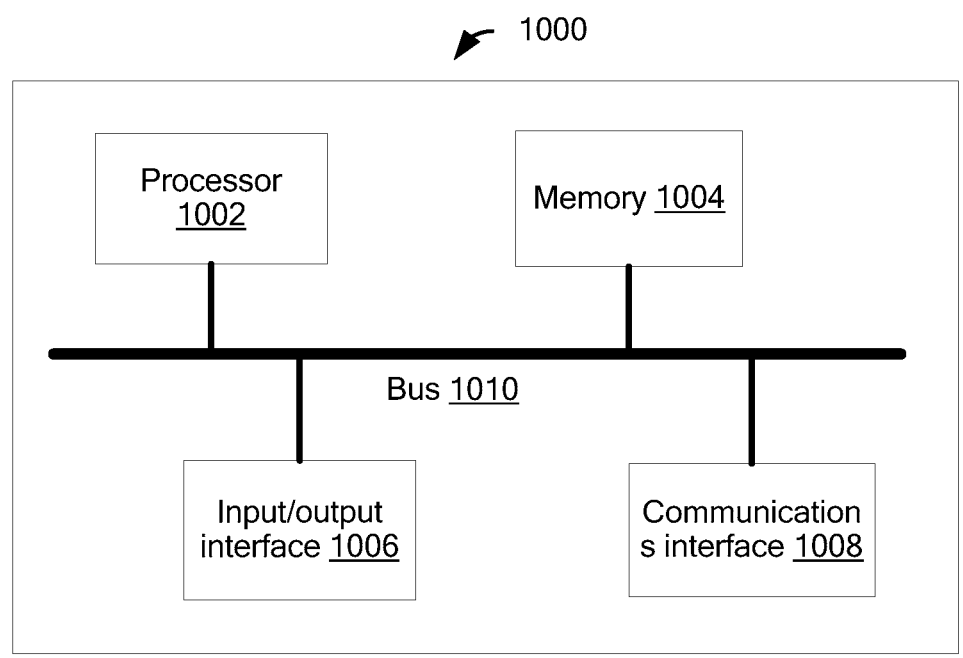
FIG. 10 is a schematic diagram of a hardware structure of an execution network element according to an embodiment of the present invention.

FIG. 10 is a schematic diagram of a hardware structure of an execution network element according to an embodiment of the present invention. As shown in FIG. 10, the execution network element 1000 may be used as an implementation of the execution network element 600. The execution network element 1000 includes a processor 1002, a memory 1004, an input/output interface 1006, a communications interface 1008, and a bus 1010. The processor 1002, the memory 1004, the input/output interface 1006, and the communications interface 1008 implement communication and connection between each other by using the bus 1010.

It should be understood that the execution network element 1000 may be specifically a computer device.

By using a general-purpose central processing unit (CPU), a microprocessor, an application-specific integrated circuit (ASIC), or one or more integrated circuits, the processor 1002 may be configured to: execute a related program, so as to implement the action of the processing unit 604 included in the execution network element 600 provided in the embodiment of the present invention; or execute the method that needs to be executed by the execution network element provided in the method embodiment of the present invention. The processor 1002 may be an integrated circuit chip, and has a signal processing capability. In an implementation process, the processing unit 604 may be implemented by using an integrated logic circuit of hardware in the processor 1002 or an instruction in a form of software. The processor 1002 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any normal processor, or the like.

The memory 1004 may be a read-only memory (ROM), a static storage device, a dynamic storage device, or a random access memory (RAM). The memory 1004 may store data and code of the related program used to implement the processing unit 604 included in the execution network element 600 provided in the embodiment of the present invention or to execute the method that needs to be executed by the execution network element provided in the method embodiment of the present invention.

The input/output interface 1006 is configured to: receive input data and information, and output data such as an operation result.

A transceiver apparatus that includes but is not limited to a transceiver is used as the communications interface 1008. The receiving unit 602 may be the communications interface 1008, so as to implement the action of the receiving unit 602 in the execution network element 600. The communications interface 1008 may execute the receiving action executed by the execution network element in the method embodiment of the present invention.

The bus 1010 may include a path for transmitting information between components (for example, the processor 1002, the memory 1004, the input/output interface 1006, and the communications interface 1008) in the execution network element 1000.

It should be noted that only the processor 1002, the memory 1004, the input/output interface 1006, the communications interface 1008, and the bus 1010 are shown for the execution network element 1000 in FIG. 10. However, in a specific implementation process, a person skilled in the art should understand that the execution network element 1000 further includes other components essential for normal running. In addition, a person skilled in the art should understand that according to a specific requirement, the execution network element 1000 may further include hardware components for implementing other additional functions. In addition, a person skilled in the art should understand that the execution network element 1000 may include only components essential for implementing this embodiment of the present invention, but not necessarily include all the components shown in FIG. 10.

It should be noted that for brief description, the foregoing method embodiment is expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that the embodiments described in this specification all belong to examples of embodiments, and the involved actions and units are not necessarily mandatory to the present invention.

Content such as information exchange between the units in the apparatuses and the system and execution processes thereof is based on a same idea as the method embodiment of the present invention. Therefore, for detailed content, refer to the descriptions in the method embodiment of the present invention. Details are not described herein again.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may be a magnetic disk, an optical disc, a read-only memory (ROM), a random access memory (RAM), or the like.

Specific examples are used in this specification to describe the principle and implementations of the present invention. The descriptions of the foregoing embodiments are merely intended to help understand the method and idea of the present invention. In addition, with respect to the specific implementations and the application scope, modifications may be made by a person of ordinary skill in the art according to the idea of the present invention. In conclusion, content of this specification shall not be construed as a limitation on the present invention.

What is claimed is:

1. A service traffic control method, wherein the method comprises:
   obtaining reference load information of a service resource used to process a target service, wherein the reference load information indicates a usage status of the service resource;
   determining target traffic control information of the target service according to the reference load information, wherein the target traffic control information indicates a processing policy of a service request of the target service, and comprises an upper limit of a quantity of service requests of the target service that need to be responded to in a next control cycle;
   obtaining an address of a target execution network element corresponding to the target service; and
   sending a traffic control message to the target execution network element according to the address of the target execution network element, wherein the traffic control message comprises the target traffic control information;
   wherein the determining target traffic control information of the target service according to the reference load information comprises:
   obtaining reference traffic information of the target service, wherein the reference traffic information indicates the quantity of service requests of the target service that need to be responded to by a service sampling network element in any sampling cycle, or the reference traffic information indicates the quantity of service requests of the target service that need to be responded to by the service sampling network element at an obtaining time of the reference traffic information;
   determining whether the reference load information meets a traffic control condition; and
      using, as the upper limit, a product of a control coefficient and the quantity of service requests of the target service that is indicated by the reference traffic information in response to determining that the reference load information meets the traffic control condition, wherein the control coefficient is a real number greater than or equal to 0 and less than 1.

2. The method according to claim 1, wherein the obtaining reference traffic information of the target service comprises: extracting the reference traffic information from a traffic message that is from the service sampling network element.

3. The method according to claim 2, wherein the method is executed by a decision network element; the traffic message further comprises an address of a target decision network element corresponding to the target service; and only if the address of the target decision network element corresponding to the target service is the same as an address of the decision network element, the product of the control coefficient and the quantity of service requests of the target service that is indicated by the reference traffic information is used as the upper limit.

4. The method according to claim 2, wherein the traffic message further comprises obtaining time information of the reference traffic information; a time indicated by the obtaining time information is the obtaining time of the reference traffic information; and only if the obtaining time of the reference traffic information is later than an obtaining time of previous traffic information, the product of the control coefficient and the quantity of service requests of the target service that is indicated by the reference traffic information is used as the upper limit, wherein the previous traffic information is traffic information received before the reference traffic information is received.

5. The method according to claim 1, wherein the obtaining reference load information of a service resource of the resource sampling network element comprises:
    extracting the reference load information from a load message that is from the resource sampling network element.

6. The method according to claim 5, wherein the method is executed by a decision network element; the load message further comprises an address of a target decision network element corresponding to the service resource; and only if the address of the target decision network element corresponding to the service resource is the same as the address of the decision network element, the target traffic control information of the target service is determined according to the reference load information.

7. The method according to claim 5, wherein the load message further comprises obtaining time information of the reference load information; and
    only if a time indicated by the obtaining time information of the reference load information is later than a time indicated by obtaining time information of previous load information, the target traffic control information of the target service is determined according to the reference load information, wherein the previous load information is load information received before the reference load information is received.

8. The method according to claim 1, wherein the traffic control message further comprises service control identifier information of the target service; the service control identifier information identifies the target service; and the service control identifier information comprises at least one of a service type identifier of the target service, an address of a decision network element, the address of the target execution network element, duration of a control cycle of traffic control information of the target service, a network layer protocol version of the target service, a transport layer protocol type of the target service, or a destination port number of a transport layer protocol of the target service.

9. The method according to claim 1, wherein the traffic control message further comprises determining time information of the target traffic control information that allows the target execution network element determines, according to the determining time information, whether the target traffic control information is repeated information.

10. The method according to claim 1, wherein the sending a traffic control message to the target execution network element according to the address of the target execution network element comprises:
    determining, according to the address of the target execution network element, an address of a forwarding gateway corresponding to the target execution network element; and
    sending the traffic control message to the forwarding gateway according to the address of the forwarding gateway, wherein the traffic control message is forwarded by the forwarding gateway to the target execution network element, wherein the traffic control message comprises the address of the target execution network element.

11. The method according to claim 1, wherein before the sending a traffic control message to the target execution network element according to the address of the target execution network element, the method further comprises:
    determining whether the address of the target execution network element is an address of a decision network element; and
    only if the address of the target execution network element is not the address of the decision network element, sending the traffic control message to the target execution network element according to the address of the target execution network element.

12. A service traffic control system, wherein the system comprises:
    a resource sampling network element, configured to:
        obtain reference load information of a service resource that is of the resource sampling network element and that is used to process a target service, wherein the reference load information indicates a usage status of the service resource; and
        send a load message to a decision network element, wherein the load message comprises the reference load information;
    a service sampling network element, configured to:
        obtain reference traffic information of the target service, wherein the reference traffic information indicates a quantity of service requests of the target service that are responded to by a service sampling network element in any sampling cycle, or the reference traffic information indicates the quantity of service requests of the target service that are responded to by the service sampling network element at an obtaining time of the reference traffic information; and
        send a traffic message to the decision network element, wherein the traffic message comprises the reference traffic information;
    the decision network element, configured to:
        determine target traffic control information of the target service according to the reference load information obtained by the resource sampling network element, wherein the target traffic control information indicates a processing policy of a service request of the target service, wherein the target traffic control information comprises an upper limit of the quantity of service requests of the target service that need to be responded to in a next control cycle, and wherein the target traffic control information of the target service is determined according to the reference load information by:
    determining whether the reference load information meets a traffic control condition; and
    using, as the upper limit, a product of a control coefficient and the quantity of service requests of the target service that is indicated by the reference traffic information in response to determining that the reference load information meets the traffic control condition, wherein the control coefficient is a real number greater than or equal to 0 and less than 1; and
  send a traffic control message to an execution network element, wherein the traffic control message comprises the target traffic control information; and
the execution network element, configured to execute, for the target service according to the target traffic control information determined by the decision network element, the processing policy that is of the service request of the target service and that is indicated by the target traffic control information.

13. The system according to claim 12, wherein the load message further comprises resource identifier information of the service resource; the resource identifier information identifies the service resource; and the resource identifier information comprises at least one of a resource type identifier of the service resource, an address of the decision network element, an address of the resource sampling network element, or duration of a sampling cycle of load information of the service resource.

14. The system according to claim 12, wherein the load message further comprises obtaining time information of the reference load information, and the decision network element is further configured to determine, according to the obtaining time information of the reference load information, whether the reference load information is repeated information.

15. The system according to claim 12, wherein the traffic message further comprises service traffic identifier information of the target service; the service traffic identifier information identifies the target service; and the service traffic identifier information comprises at least one of a service type identifier of the target service, an address of the decision network element, an address of the service sampling network element, duration of a sampling cycle of traffic information of the target service, a network layer protocol version of the target service, a transport layer protocol type of the target service, or a destination port number of a transport layer protocol of the target service.

16. The system according to claim 12, wherein the traffic message further comprises obtaining time information of the reference traffic information; the obtaining time information indicates the obtaining time of the reference traffic information; and the decision network element is further configured to determine, according to the obtaining time information of the reference traffic information, whether the reference traffic information is repeated information.

17. The system according to claim 12, wherein the traffic control message further comprises service control identifier information of the target service; the service control identifier information identifies the target service; and the service control identifier information comprises at least one of a service type identifier of the target service, an address of the decision network element, an address of the execution network element, a control cycle of traffic control information of the target service, a network layer protocol version of the target service, a transport layer protocol type of the target service, or a destination port number of a transport layer protocol of the target service.

18. The system according to claim 12, wherein the traffic control message further comprises determining time information of the target traffic control information, and the execution network element is further configured to determine, according to the determining time information, whether the target traffic control information is repeated information.

19. A decision network element, wherein the decision network element comprises:
  at least one processor; and
  a non-transitory computer-readable storage medium coupled to the at least one processor and storing programming instructions for execution by the at least one processor, wherein the programming instructions instruct the at least one processor to:
    obtain reference load information of a service resource used to process a target service, wherein the reference load information indicates a usage status of the service resource;
    determine target traffic control information of the target service according to the reference load information, wherein the target traffic control information indicates a processing policy of a service request of the target service, wherein the target traffic control information comprises an upper limit of a quantity of service requests of the target service that need to be responded to in a next control cycle;
    obtain an address of a target execution network element corresponding to the target service; and
    send a traffic control message to the target execution network element according to the address of the target execution network element, wherein the traffic control message comprises the target traffic control information;
  wherein the target traffic control information of the target service is determined according to the reference load information by:
    obtaining reference traffic information of the target service, wherein a reference traffic information indicates the quantity of service requests of the target service that are responded to by a service sampling network element in any sampling cycle, or the reference traffic information indicates the quantity of service requests of the target service that are responded to by the service sampling network element at an obtaining time of the reference traffic information;
    determining whether the reference load information meets a traffic control condition; and
    using, as the upper limit, a product of a control coefficient and the quantity of service requests of the target service that is indicated by the reference traffic information in response to determining that the reference load information meets the traffic control condition, wherein the control coefficient is a real number greater than or equal to 0 and less than 1.

20. The decision network element according to claim 19, wherein the programming instructions instruct the at least one processor to:
  extract the reference traffic information from a traffic message that is from the service sampling network element.

21. The decision network element according to claim 20, wherein the traffic message further comprises an address of a target decision network element corresponding to the target service, and only if the address of the target decision network element corresponding to the target service is the same as an address of the decision network element, the programming instructions instruct the at least one processor to use, as the upper limit, the product of the control coefficient and the quantity of service requests of the target service that is indicated by the reference traffic information.

22. The decision network element according to claim 20, wherein the traffic message further comprises obtaining time information of the reference traffic information; a time indicated by the obtaining time information is the obtaining time of the reference traffic information; and only if the obtaining time of the reference traffic information is later than an obtaining time of previous traffic information, the programming instructions instruct the at least one processor to use, as the upper limit, the product of the control coefficient and the quantity of service requests of the target service that is indicated by the reference traffic information, wherein the previous traffic information is traffic information received before the reference traffic information is received.

23. The decision network element according to claim 19, wherein the programming instructions instruct the at least one processor to:
extract the reference load information from a load message that is from a resource sampling network element.

24. The decision network element according to claim 23, wherein the load message further comprises an address of a target decision network element corresponding to the service resource, and only if the address of the target decision network element corresponding to the service resource is the same as the address of the decision network element, the programming instructions instruct the at least one processor to determine the target traffic control information of the target service according to the reference load information.

25. The decision network element according to claim 23, wherein the load message further comprises obtaining time information of the reference load information, and only if a time indicated by the obtaining time information of the reference load information is later than a time indicated by obtaining time information of previous load information, the programming instructions instruct the at least one processor to determine the target traffic control information of the target service according to the reference load information, wherein the previous load information is load information received before the reference load information is received.

26. The decision network element according to claim 19, wherein the traffic control message further comprises service control identifier information of the target service; the service control identifier information identifies the target service; and the service control identifier information comprises at least one of a service type identifier of the target service, the address of the decision network element, the address of the target execution network element, duration of a control cycle of traffic control information of the target service, a network layer protocol version of the target service, a transport layer protocol type of the target service, or a destination port number of a transport layer protocol of the target service.

27. The decision network element according to claim 19, wherein the traffic control message further comprises determining time information of the target traffic control information that allows the target execution network element determines, according to the determining time information, whether the target traffic control information is repeated information.

28. The decision network element according to claim 19, wherein the programming instructions instruct the at least one processor to:
determine, according to the address of the target execution network element, an address of a forwarding gateway corresponding to the target execution network element; and
send the traffic control message to the forwarding gateway according to the address of the forwarding gateway, wherein the traffic control message is forwarded by the forwarding gateway to the target execution network element, wherein the traffic control message comprises the address of the target execution network element.

29. The decision network element according to claim 19, wherein before sending the traffic control message to the target execution network element according to the address of the target execution network element, the programming instructions instruct the at least one processor to:
determine whether the address of the target execution network element is the address of the decision network element; and
only if the address of the target execution network element is not the address of the decision network element, the programming instructions instruct the at least one processor to send the traffic control message to the target execution network element according to the address of the target execution network element.

* * * * *